(12) United States Patent
Ratz et al.

(10) Patent No.: US 6,864,659 B2
(45) Date of Patent: Mar. 8, 2005

(54) VARIABLE SPEED CONTROLLER FOR AIR MOVING APPLICATIONS USING AN AC INDUCTION MOTOR

(75) Inventors: James W. Ratz, Bloomington, MN (US); Paul E. Sigafus, Medina, MN (US); Larry L. Lutton, Burnsville, MN (US); Nickolas G. Vrionis, Los Altos, CA (US)

(73) Assignee: Varidigm Corporation, Plymouth, MN (US)

( * ) Notice: Subject to any disclaimer, the term of this patent is extended or adjusted under 35 U.S.C. 154(b) by 29 days.

(21) Appl. No.: 10/191,975

(22) Filed: Jul. 9, 2002

(65) Prior Publication Data

US 2003/0030408 A1 Feb. 13, 2003

Related U.S. Application Data

(60) Provisional application No. 60/304,954, filed on Jul. 12, 2001.

(51) Int. Cl.[7] .............................. H02P 1/44; H02P 5/28; H02P 7/36
(52) U.S. Cl. ...................................... 318/772; 318/727
(58) Field of Search ................................. 318/772, 727, 318/798, 806, 774, 781; 236/10, 91 F, 74 R, 74 A, 75–78; 431/16, 78

(56) References Cited

U.S. PATENT DOCUMENTS

| | | | | |
|---|---|---|---|---|
| 4,266,175 A | * | 5/1981 | Braun et al. ................. | 318/758 |
| 4,421,268 A | | 12/1983 | Bassett et al. ................ | 236/10 |
| 4,443,749 A | * | 4/1984 | Douthart et al. ............. | 318/774 |
| 4,481,786 A | * | 11/1984 | Bashark ....................... | 318/438 |
| 4,562,397 A | | 12/1985 | Kitabayashi et al. ........ | 318/814 |
| 4,605,888 A | | 8/1986 | Kim ............................. | 318/786 |
| 4,658,195 A | | 4/1987 | Min ............................. | 318/786 |
| 4,945,298 A | | 7/1990 | Satake ......................... | 318/538 |
| 5,276,392 A | | 1/1994 | Beckerman ................. | 318/751 |
| 5,561,356 A | | 10/1996 | Nanos ......................... | 318/729 |
| 5,594,312 A | | 1/1997 | Schwendemann et al. .. | 318/799 |
| 5,680,021 A | * | 10/1997 | Hollenbeck ................. | 318/432 |
| 5,808,441 A | | 9/1998 | Nehring ...................... | 318/751 |
| 5,867,005 A | | 2/1999 | Brown ........................ | 318/751 |
| 5,883,487 A | | 3/1999 | Rosenzweig et al. ....... | 318/781 |
| 5,883,490 A | | 3/1999 | Moreira ...................... | 318/807 |
| 5,986,419 A | | 11/1999 | Archer et al. ............... | 318/254 |
| 6,208,113 B1 | | 3/2001 | Lelkes et al. ................ | 318/807 |
| 6,329,783 B1 | | 12/2001 | Vrionis et al. ............... | 318/772 |
| 6,329,785 B1 | * | 12/2001 | Starkie et al. .............. | 318/811 |
| 6,504,338 B1 | * | 1/2003 | Eichorn ...................... | 318/727 |

FOREIGN PATENT DOCUMENTS

| | | | | |
|---|---|---|---|---|
| FR | 2 608 859 | 6/1988 | ............. | H02P/1/44 |
| JP | 61 009179 | 1/1986 | ............. | H02P/1/42 |

OTHER PUBLICATIONS

Translation Document (Abstract) FR 2608859 A1.*

* cited by examiner

*Primary Examiner*—Shih-Yung Hsieh
*Assistant Examiner*—Edgardo San Martin
(74) *Attorney, Agent, or Firm*—Pauley Petersen & Erickson

(57) ABSTRACT

An HVAC system has at least one variable speed controller for an AC induction motor, especially of the Permanent Split Capacitor (PSC) type. The variable speed controller provides switched power via a modulating triac to the main coils of the motor and constant power via an on/off triac to the auxiliary coils during operation. A large value capacitor is placed in line with the auxiliary coils to reduce power consumption and current draw over that of known systems. Power to the motor can be turned off to provide for motor speed sensing through monitoring the frequency of a generated voltage when the power is turned off. Frequency-based motor speed sensing is accomplished by shutting off all current to the motor and measuring zero crossings on the generated voltage of the decaying magnetic field. The controller can be easily retrofitted onto existing motors. An optional controller bypass is provided to run the motor at rated speed in case of controller failure.

35 Claims, 13 Drawing Sheets

Dual Triac Controller Using Standard PSC Motors

Typical Motor Connections

Single Speed Motor Connections

Three Speed Motor Connections

Impact of Capacitor Size on Power Factor

Impact of Capacitor Size on Harmonic Distortion

Controller Comparisons- Power

Controller Comparisons - Current

VARIABLE SPEED CONTROLLER FOR AIR MOVING APPLICATIONS USING AN AC INDUCTION MOTOR

This application claims the benefit of the filing date of U.S. Provisional Application Ser. No. 60/304,954 filed 12 Jul. 2001.

BACKGROUND OF THE INVENTION

1. Field of the Invention

The present invention relates to variable speed controls for AC induction motors such as may be used in air moving applications.

2. Discussion of Related Art

Many applications for electric motors demand variable speeds from the motor. For example a blower motor in a household heating, ventilation and air-conditioning (HVAC) system will typically be a fractional horsepower motor driving a blower unit or fan blade which requires motor speed adjustment to enable efficient operation of the HVAC system.

Inexpensive induction motors are desirably utilized in many applications. These motors are not particularly well adapted for variable speed usage. Rather they are designed to operate efficiently only at one best speed and inefficiencies result when trying to run the motor at other than the designed speed. However, many systems, such as the above HVAC applications, would benefit greatly from having a wider range of motor speeds available.

In the past art, a variable range of speeds from one induction motor was obtained through the use of expensive controllers changing the frequency and voltage of the input to the motor windings. Expensive controllers such as these were necessary because, as the input to the motor windings strays farther from sinusoidal, motor efficiency and power factor drop while current and total harmonic distortion rises, resulting in unacceptable noise, heat, efficiency loss, and motor life.

FIGS. 1A and 1B are diagrams showing the electrical hookups of standard single speed and multi-tap PSC motors, respectively. The known multi-tap technique involves using a multi-tap motor to attain a number of fixed selectable speeds by mechanical switching between the taps. A multi-tap motor may have connections physically switched between terminals to achieve multiple, but not variable, speeds from its AC induction motor. FIG. 2 shows how a standard single triac control is typically installed to operate a PSC motor, as known in the art. The drawbacks of the motors of FIGS. 1A and 1B within a continuously variable speed motor environment are self evident. The known triac control of FIG. 2 does not permit optimum performance in terms of current draw and total harmonic distortion (THD) since the line voltage to both the auxiliary and main coils is chopped by the triac. Thus, known motor controllers utilizing inexpensive switching mechanisms, such as triacs, to control power to the motor windings by "chopping" the sinusoidal waveform input were thought to be of limited use in applications of continuously variable motor speed control.

Further, in the known art, some control schemes demand that the controller characteristics be matched to the known induction motor type characteristics, thereby limiting the availability of retrofitting a single type of variable speed controller to the large installed base of induction motors. Some known motor systems include a motor/controller combination that utilizes RPM and torque sensing of a motor/blower combination to infer airflow. This technique, however, dictates that the motor/controller/blower combination must be tested together so to determine the speed, torque, and airflow relationships. Once these relationships have been tested and certain parameters have been determined, a lookup table for the controller can be replicated in a microprocessor.

The disadvantage of this method is that each motor/controller/blower combination must be factory programmed. Two systems requiring the same size motor may differ only because of the unique controller software. In the event of a motor/controller/blower failure it may prove difficult to obtain a direct replacement.

It can thus be understood that there remains a need in the art for a variable speed controller for induction motors which is easily retrofitted to existing motors, provides efficient operation of the motor at variable speeds and is inexpensive in comparison to the controllers of the known art.

SUMMARY OF THE INVENTION

The present invention provides an inexpensive means for operating standard AC induction motors, especially of the permanent split capacitor (PSC) type, in a variable speed mode by addition of a sensing circuit or controller, or both. The system can be adapted to most standard PSC motors without need for any changes to the motor. Exemplary embodiments of the present system may monitor the speed of the motor and control the motor to a pre-determined set point, independent of the load. By use of the techniques described herein, including without limitation, speed sensing circuitry, other suitable feedback means, and control means, various AC induction motor arrangements may be controlled to variable speeds.

In one aspect of the present invention the controller may sometimes be referred to herein as a "dual triac" controller owing to an exemplary embodiment of the controller in which a first triac is used to control power to the main windings of the motor, and a second triac is used to turn the auxiliary winding on or off. The designation "dual triac" is not meant to foreclose or otherwise limit the use of other triacs or comparable switching mechanisms within the spirit of the present invention.

Further, words of degree, such as "about", "substantially", and the like are used herein in the sense of "at, or nearly at, when given the manufacturing and material tolerances inherent in the stated circumstances" and are used to prevent the unscrupulous infringer from unfairly taking advantage of the invention disclosure where exact or absolute figures are stated as an aid to understanding the invention.

With the variable speed controller/motor combination of the present invention, HVAC systems having AC induction motors requiring variable speed motors for more sophisticated control systems can be inexpensively obtained and existing systems with AC induction motors may be more easily retrofitted to accommodate variable speed control.

BRIEF DISCUSSION OF THE DRAWINGS

The accompanying drawings are presented as an aid to explanation and understanding of various aspects of the present invention only and are not to be taken as limiting the present invention. The drawings are not necessarily to scale, nor should they be taken as photographically accurate depictions of real objects unless otherwise stated. Thus, exemplary aspects of the invention are described below along with the appended drawing figures in which.

DETAILED DESCRIPTION OF THE PREFERRED EMBODIMENTS

Figure 1A:
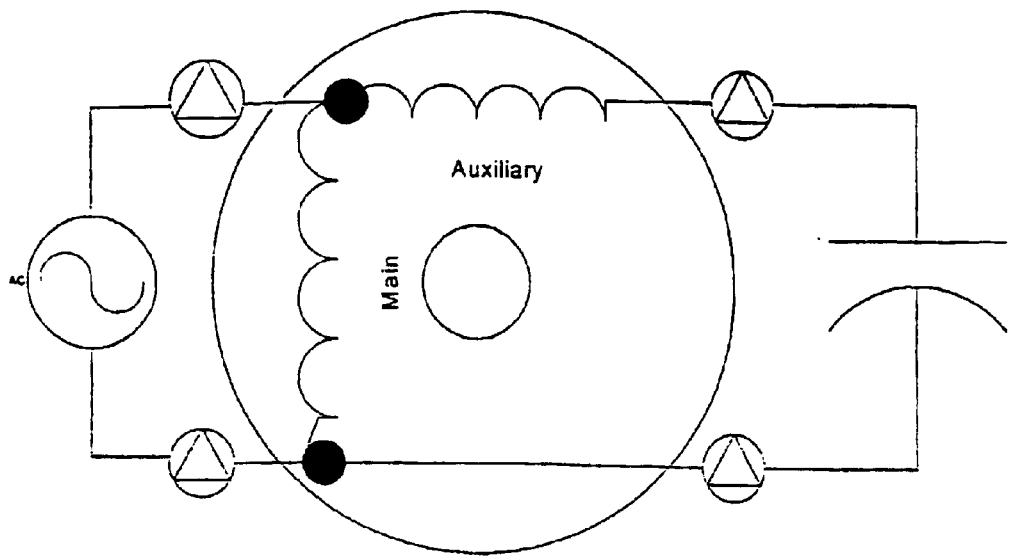
FIGS. 1A and 1B are diagrams showing the electrical hookups of standard single speed and multi-tap PSC motors, respectively.
Figure 1B:
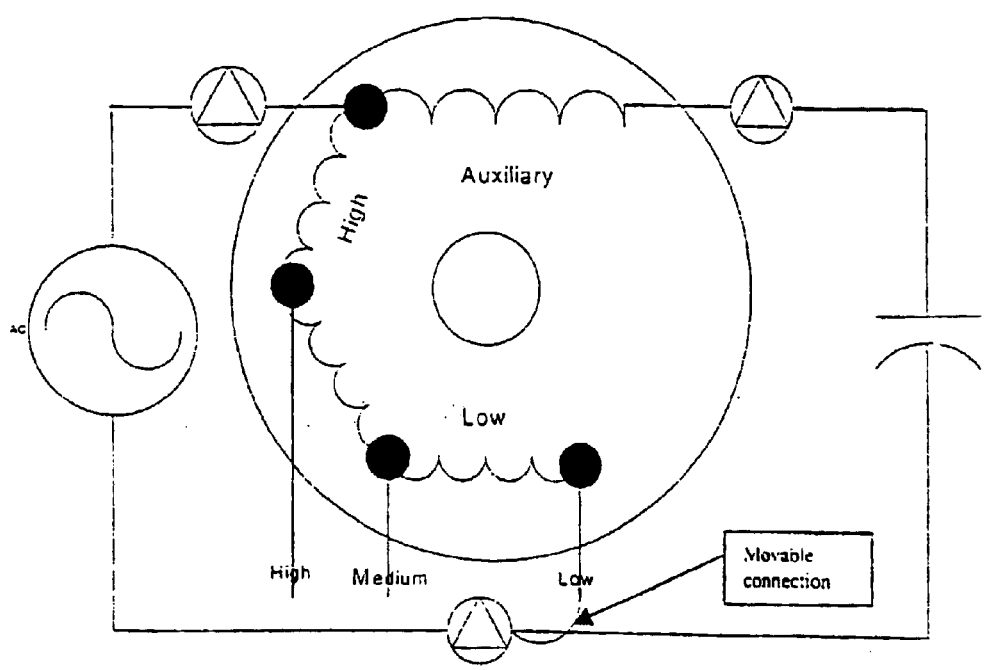
Figure 2:
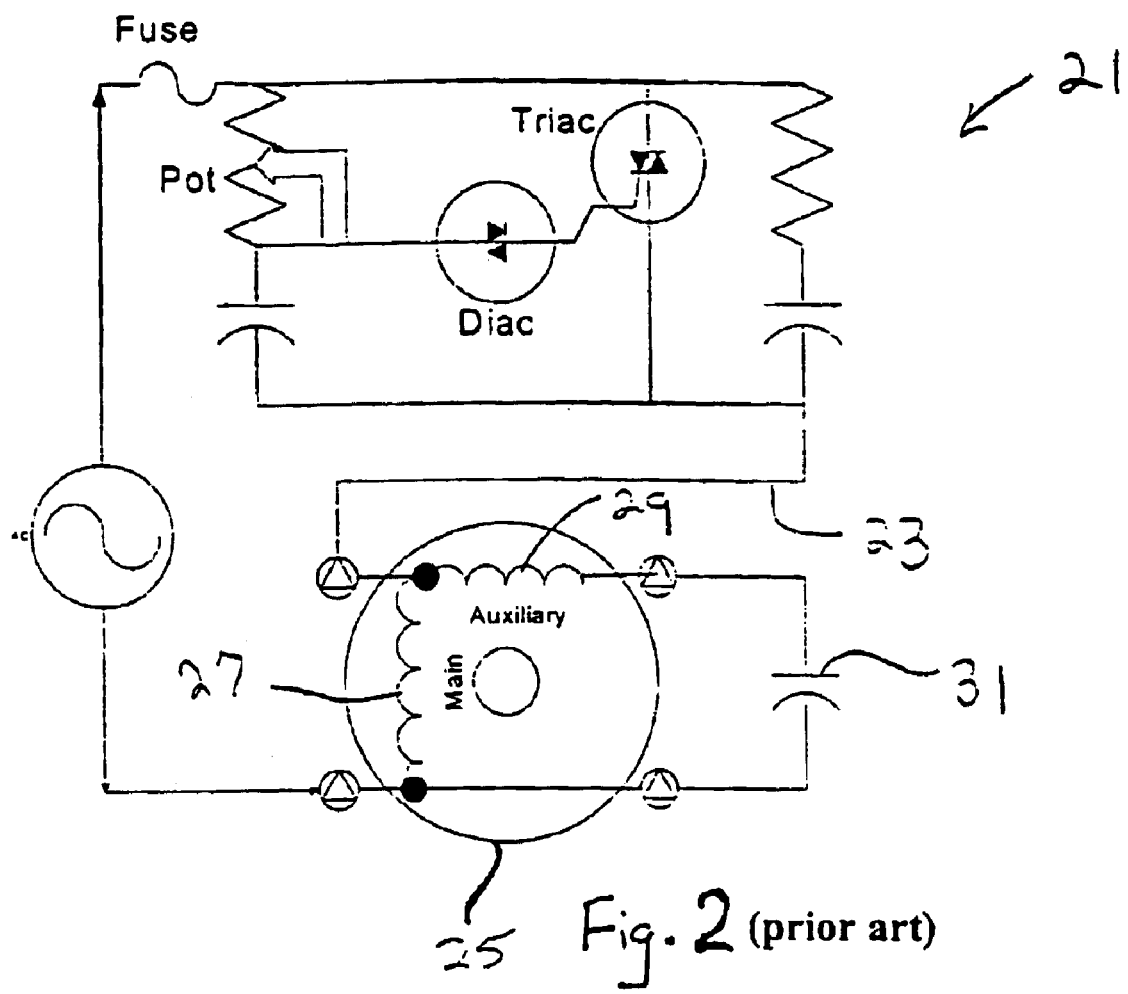
FIG. 2 shows how a standard single triac control is typically installed to operate a PSC motor, as known in the art.

Referencing FIG. 2, in one example of the typical single triac controlled motor 21 known in the art, the control voltage 23 is applied across the entire motor 25. In this manner, the voltage across the entire motor 25 is decreased as the control voltage is turned down. The main and auxiliary windings 27, 29, respectively, as well as the capacitor 31, all operate at a reduced voltage level.

Figure 3:
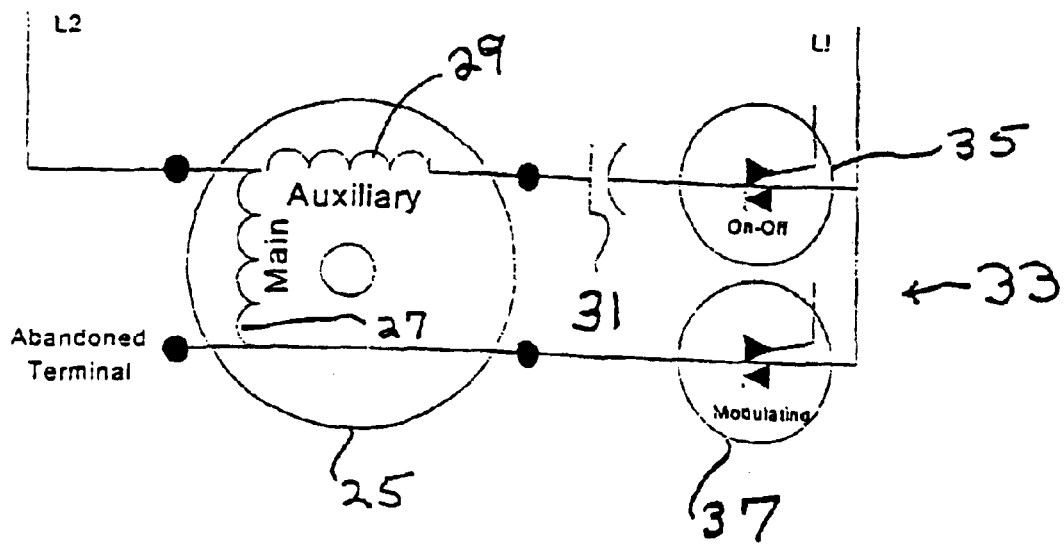
FIG. 3 shows how one embodiment of the present invention can be hooked up to operate a standard PSC motor.

As shown in FIG. 3, a dual triac control 33 is connected to place an on/off triac 35 in line with the capacitor 31 and auxiliary winding 29. Thereby, the capacitor 31 and auxiliary winding 29 are always operated at line voltage. A modulating, or control, triac 37 is placed in line with the main winding 27. The main winding can thereby be operated at lower voltages by operation of the control triac 37 in this leg of the circuit. This has the effect of reducing the current draw, harmonic distortion, and the acoustic noise associated with speed reduction since the capacitor 31 and auxiliary winding 29 operate at the smooth unclipped AC line voltage. Connecting the dual triac controller as shown in FIG. 3 rather than as shown in FIG. 2 (prior art) results in quieter operation at reduced speeds as the auxiliary winding and the capacitor continue to operate at full sinusoidal voltage while the main winding is chopped by the triac.

Figure 4:
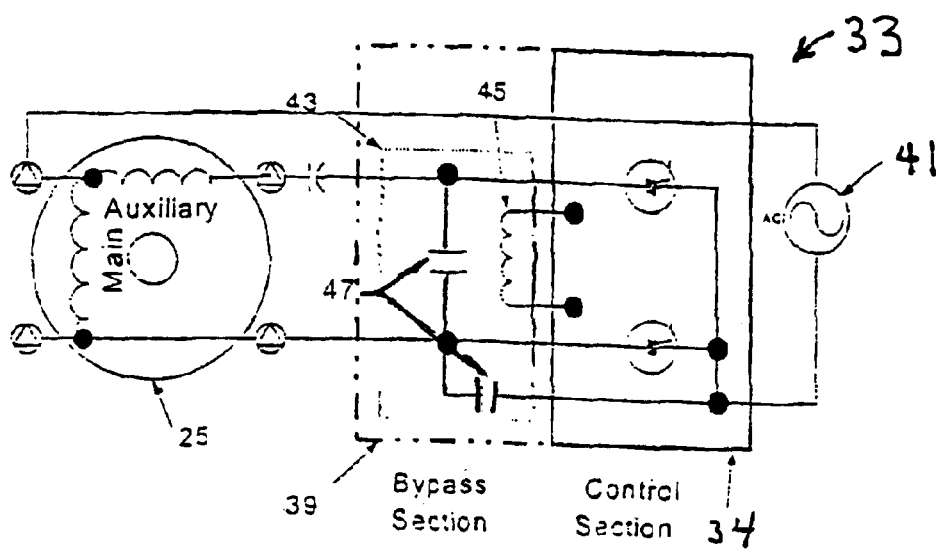
FIG. 4 shows a schematic representation of parts of the controller/motor combination according to certain aspects of the present invention.

FIG. 4 shows a highly schematic system embodiment of the controller 33 connected to the motor 25, and including a control section 34 and a bypass circuit 39 between the motor 25 and the line voltage 41. In the event of a failure of the control section 34 or if it is desired to operate the motor 25 at full speed, a bypass relay 43 is energized so as to bypass the control section 34. As seen in FIG. 4, a bypass relay coil 45 operates a bypass relay 43 to control current between the bypass section 39 and the control section 34 by operating the two bypass contacts, collectively 47, and powering the motor 25 at full speed. A microprocessor of the variable speed motor speed command module (FIG. 5) may provide an output to drive the bypass relay 43 in the event that the controller fails.

Figure 5:
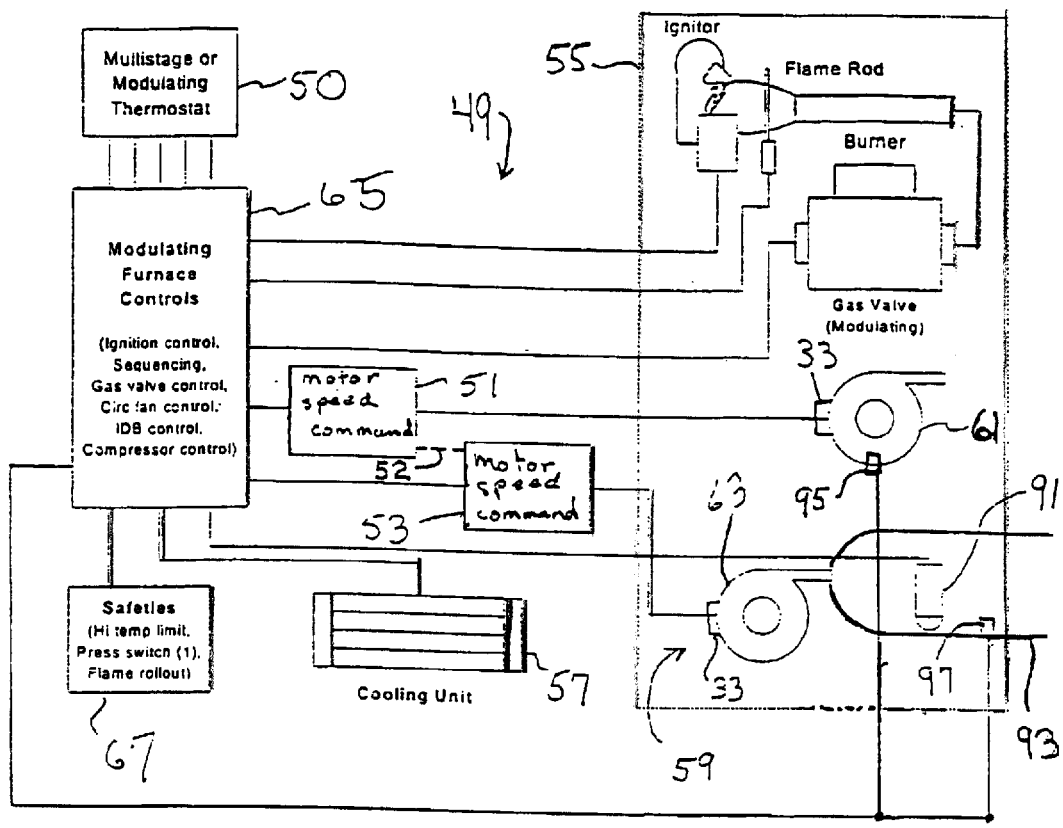
FIG. 5 shows an overall HVAC system according to certain aspects of the present invention.

FIG. 5 shows an overall air treatment system, such as HVAC system 49, with an I/O device such as a thermostat 50, having one or more variable speed motor speed command modules, e.g. 51, 53. The motor speed command modules 51, 53 are connected to the controllers 33 (FIG. 4) and modulating furnace controls 65 to provide variable speed motors 61, 63 for controlling air treatment processes. This multistage or modulating system 49 requires variable fan, i.e. blower motor, speeds because of the variable outputs required for heating 55, cooling 57 and air circulation 59, which may require the use of one or more variable speed motors such as an induced draft blower 61 used for controlled combustion air, or the circulator blower 63 for moving treated air. The motor speed command modules 51, 53 can interpret which terminal is activated on the modulating furnace controls 65 and set the required motor speed in accordance with the command from the modulating furnace controls 65. It will be appreciated that the motor speed command modules 51, 53 may be linked together, as indicated by the dotted line 52, and may physically incorporate the controller 33 or be separated therefrom. Likewise, any processing or signal functions can be physically located among, or distributed between, any of the modulating furnace controls 65, motor speed command modules 51, 53, or motor controllers 33 as desired for a given system. Safety systems 67 are connected to the modulating furnace controls 65 in the illustrated embodiment.

Figure 6:
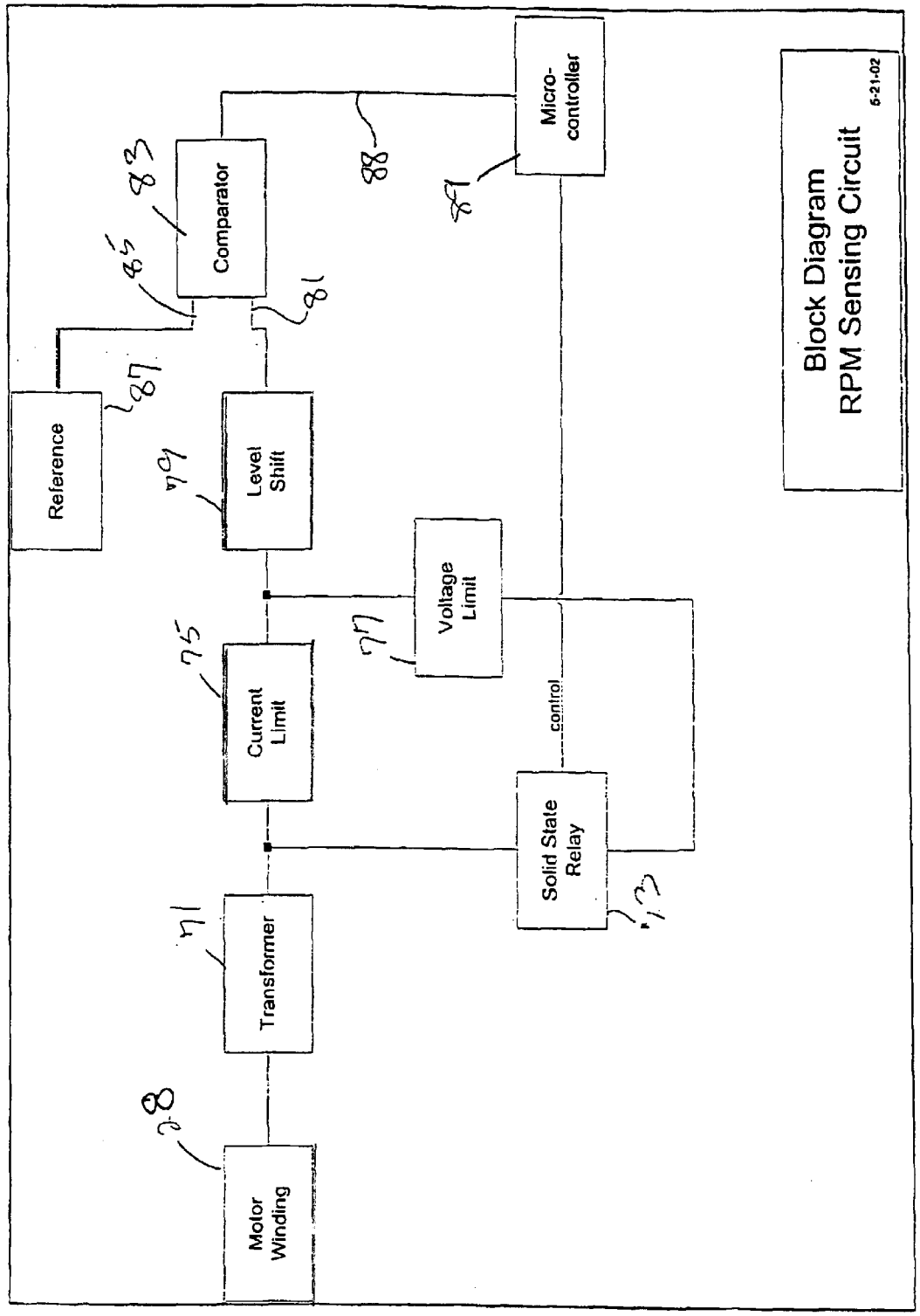
FIGS. 6 and 7 illustrate a block diagram and schematic, respectively, of an integral speed-sensing circuit using voltage generated after power to the motor has been turned off.
Figure 7:
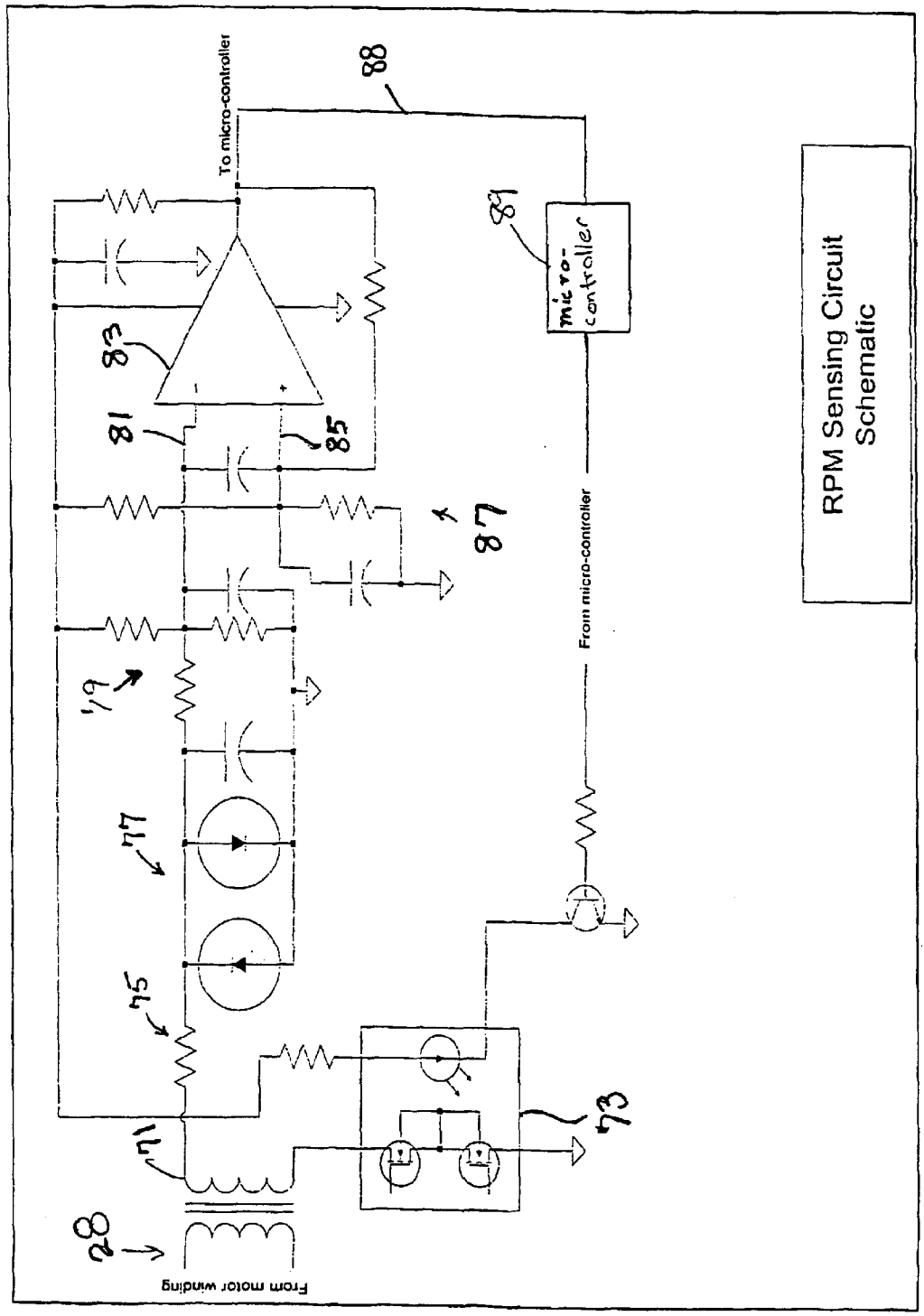

A feedback loop to ensure proper speed control is desirable. Speed regulation for the motor of the present invention can be determined by a variety of criteria. FIGS. 6 and 7 illustrate the block diagram and schematic, respectively, with respect to a speed-sensing scheme aspect of the present invention. The integral speed sensor uses the frequency of the voltage generated after power to the main and auxiliary coils has been momentarily turned off.

Figure 8:
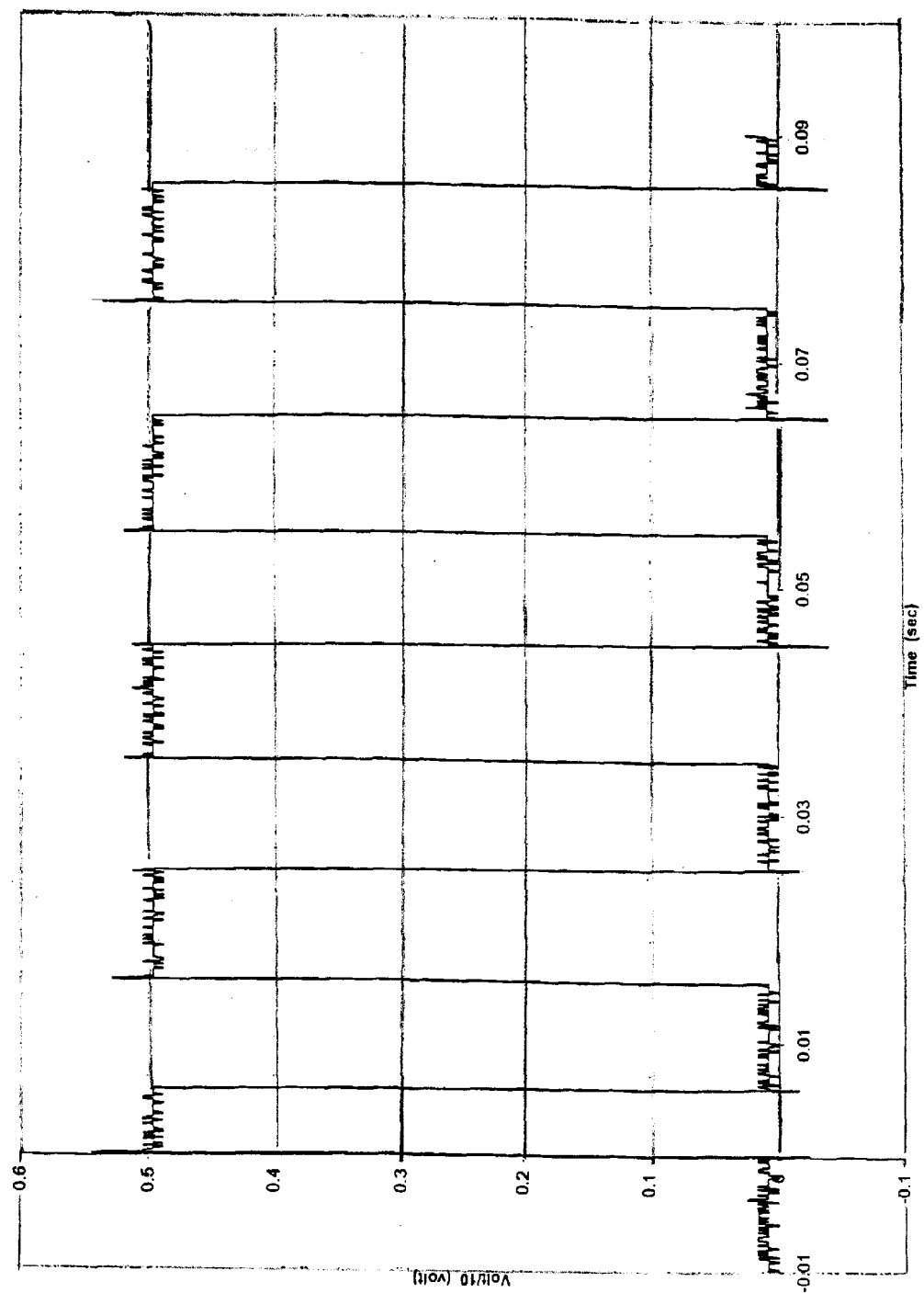
FIGS. 8 and 9 show the actual waveform of a sensors means for measuring the speed of rotation of a standard AC induction motor. Two different speeds are illustrated.
Figure 9:
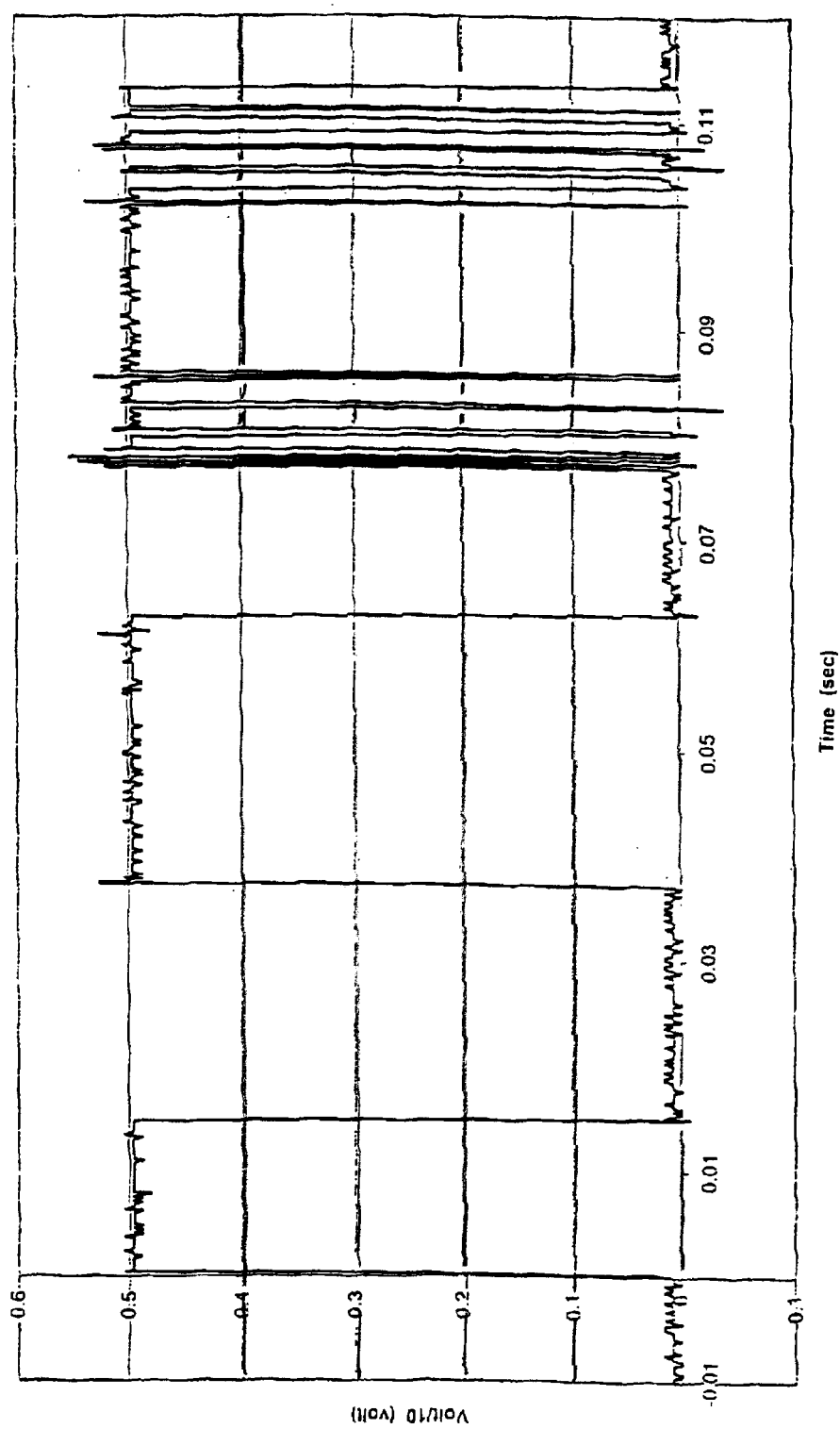

Lightly loaded AC induction motors will closely approach synchronous speed at a wide range of voltage input levels. In variable speed applications it is desirable to be able to maintain the same speed regardless of the torque requirements. By turning off the entire motor very briefly and measuring the duration between two subsequent zero crossings of the decaying generated voltage signal, the speed of motor rotation can be determined. Frequency measurement is somewhat simpler to achieve in terms of both power handling and calculations than known techniques of voltage amplitude measurement using back EMF from the powered windings. Actual data at two different speeds is shown in FIGS. 8 and 9. For means of a rough comparison, a handheld tachometer measured the motor speed of FIG. 8 at 1075 RPM while the calculated motor speed according to the present invention was 1052 RPM. The handheld tachometer measured the motor speed of FIG. 9 at 448 RPM while the calculated motor speed according to the present invention was 446 RPM. While no particular claims are made to the accuracy of this comparison, it is believed to be illustrative that the described circuitry is within the realm of adequate operating parameters for certain aspects of the present invention. The RPM can be readily calculated from the relationship, $$RPM = 60/(T*P/2) \qquad \text{[Eq. 1]}$$

Where T=period of 1 full cycle (in seconds), and
P=number of motor poles.

The RPM sensing function can be used in conjunction with other parameters to achieve higher-level control functions. For example, RPM data plus static pressure from one or more pressure sensors, e.g., 97 (FIG. 5) can be used for an airflow control loop, as further explained below. Also, the RPMs can be measured and the controller can be programmed to adjust the motor speed to a particular speed and maintain it with the RPM information.

Referring to the RPM detection circuit block diagram and schematic of FIGS. 6 and 7, the transformer 71 senses the voltage across a winding e.g., 28, of the motor 25 (FIG. 3). The transformer 71 provides isolation between motor voltage and the low voltage used for the remainder of the RPM detection circuit. When the motor RPM is to be sensed, the voltage to the motor is turned off at the first triac 35 and the second triac 37 (FIG. 3) and the solid state AC relay 73 is turned on by a command module, e.g. 51, 53 (FIG. 5). The secondary circuit of the transformer 71 is completed by the solid state AC relay 73 with current and voltage limiting, 75, 77 respectively, provided. The limited voltage is level shifted 79 and is applied to a first input 81 of a comparator 83. The second input 85 to the comparator 83 is a fixed reference voltage. The comparator output 88 is a square wave with the same period as the transformer secondary voltage. The micro-controller 89 measures the period of the square wave (see e.g. FIGS. 8 and 9) and uses this information along with the number of motor poles to calculate the motor RPM. After the square wave period is measured the micro-controller turns off the solid state AC relay and reapplies voltage to the motor to resume operation. Because the induced voltage decays rapidly below the sensitivity of the sensing circuit (FIGS. 6 and 7), as for example seen on the right hand side of FIG. 9, it is preferable to have the data captured in one or two cycles.

In many applications such as induced draft blowers, zoned systems, etc., it is desired that the airflow remain constant under all operating conditions. A constant airflow algorithm, provided for the controller by a command module, such as described in the copending application Ser. No. 09/904,428, filed 12 Jul. 2001 and of common ownership herewith, can provide this capability when required. This technique relies on knowing the RPM of the motor and the motor/blower characterization in order to infer the airflow. It will be appreciated that any variable speed AC induction motor control mechanism operating with RPM data for feedback and control may utilize the speed sensing circuitry disclosed herein, which is not limited to the exemplary dual triac embodiment, as further explained below.

Some techniques include a motor/controller/blower combination that utilizes RPM and torque sensing of a motor/controller/blower combination to infer airflow. This technique, however, dictates that the motor/controller/blower combination must be tested together so as to determine the speed, torque, and airflow relationships. Once these relationships have been tested and certain parameters have been determined a lookup table can be replicated in a microprocessor in the command modules 51, 53. The disadvantage of this method is that each motor/blower/controller combination must be factory programmed. Thus, two systems requiring the same size motor may differ only because of the unique controller software. In the event of a motor/controller/blower failure it may prove difficult to obtain a direct replacement. However, such systems may be used in conjunction with certain aspects of the present invention where appropriate.

Figure 18:
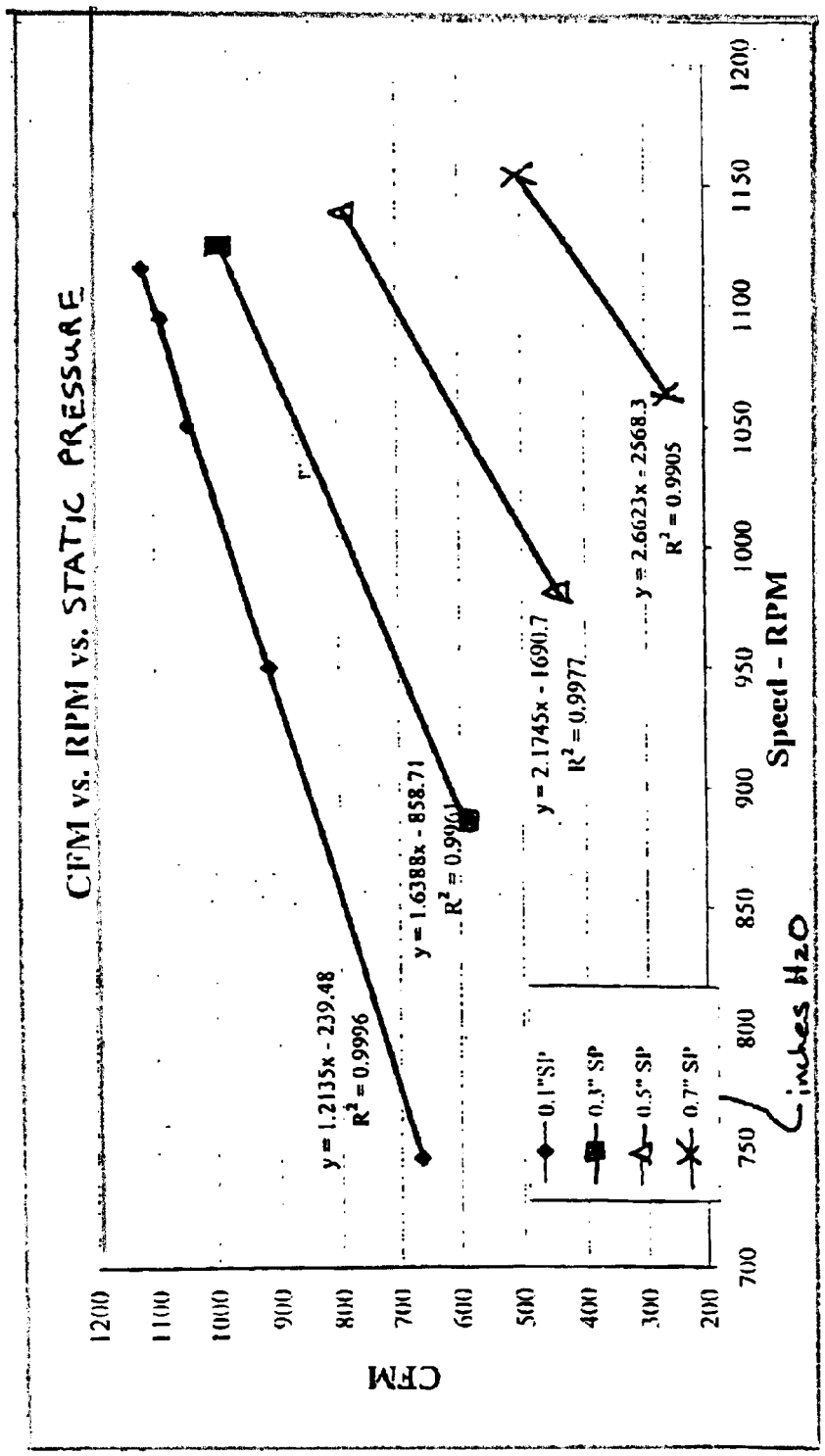
FIG. 18 shows the relationship between CFM and RPM at four different static pressures.
Figure 1A:
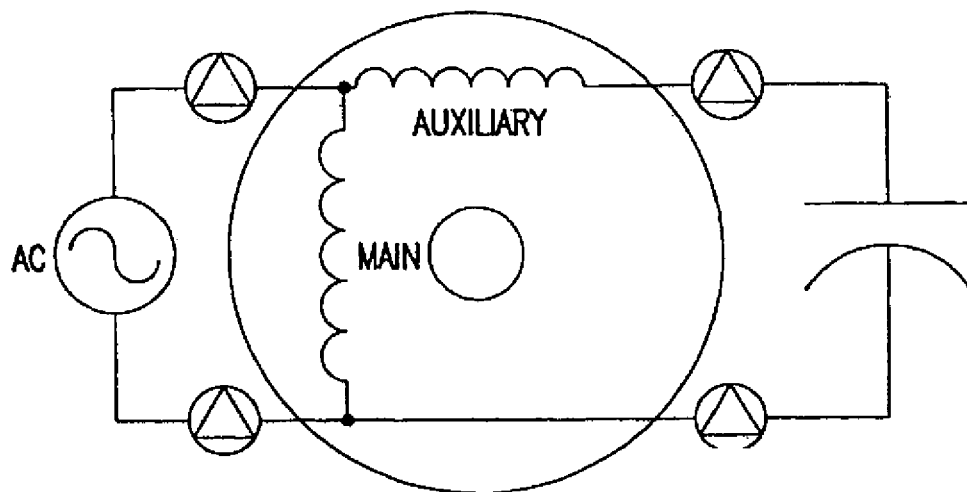
Figure 1B:
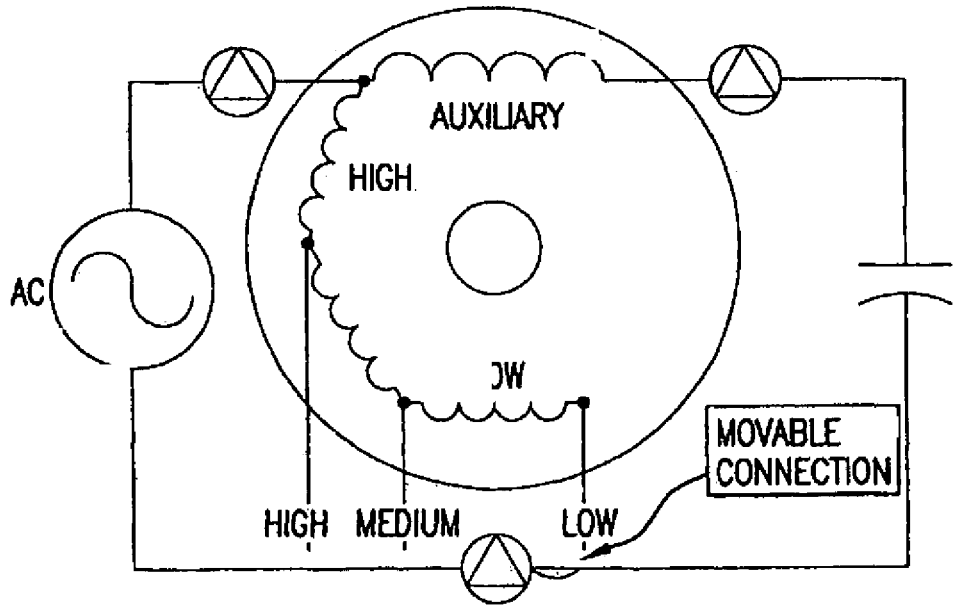
Figure 2:
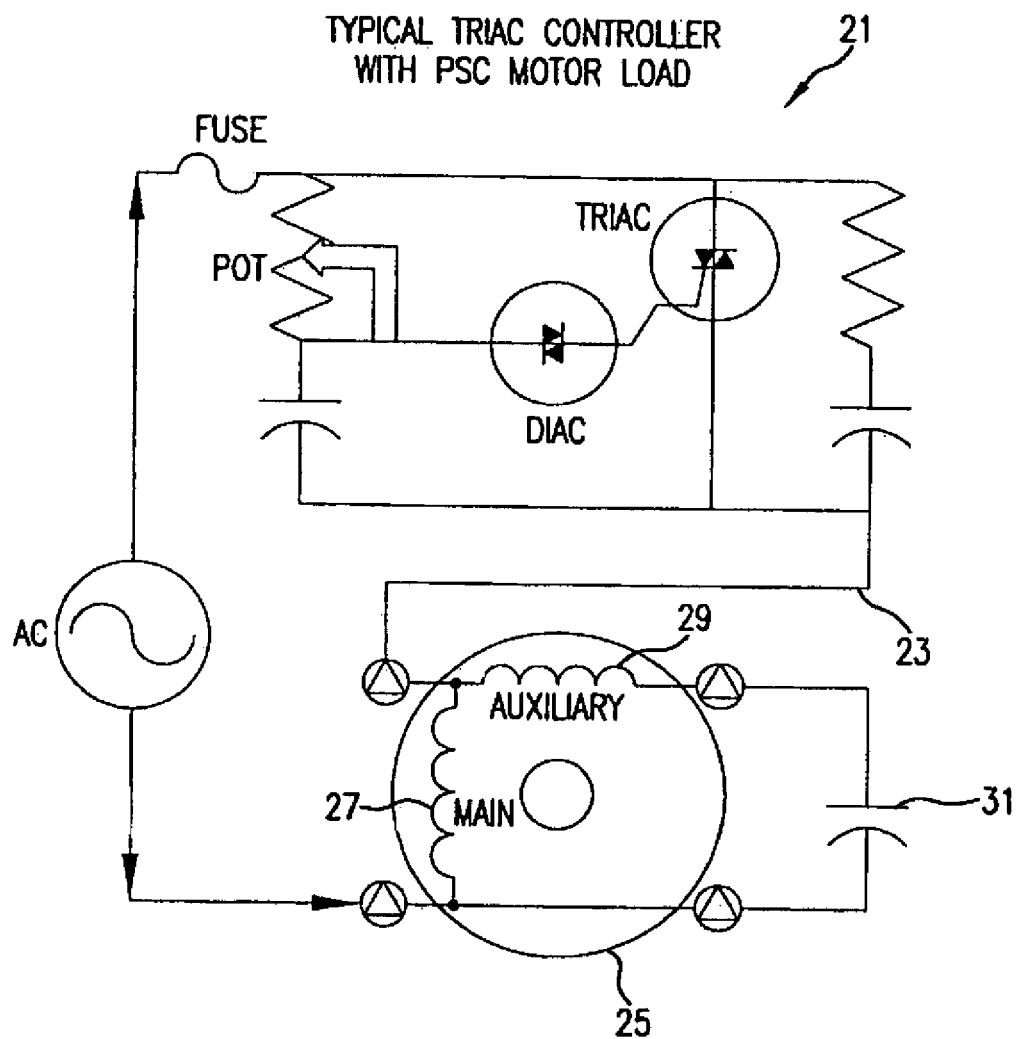
Figure 3:
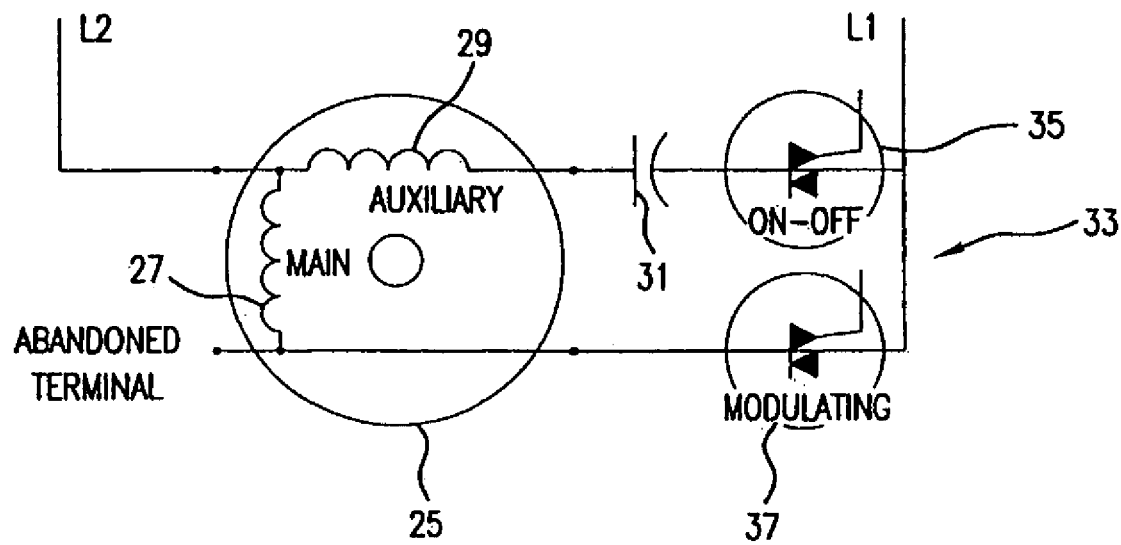
Figure 4:
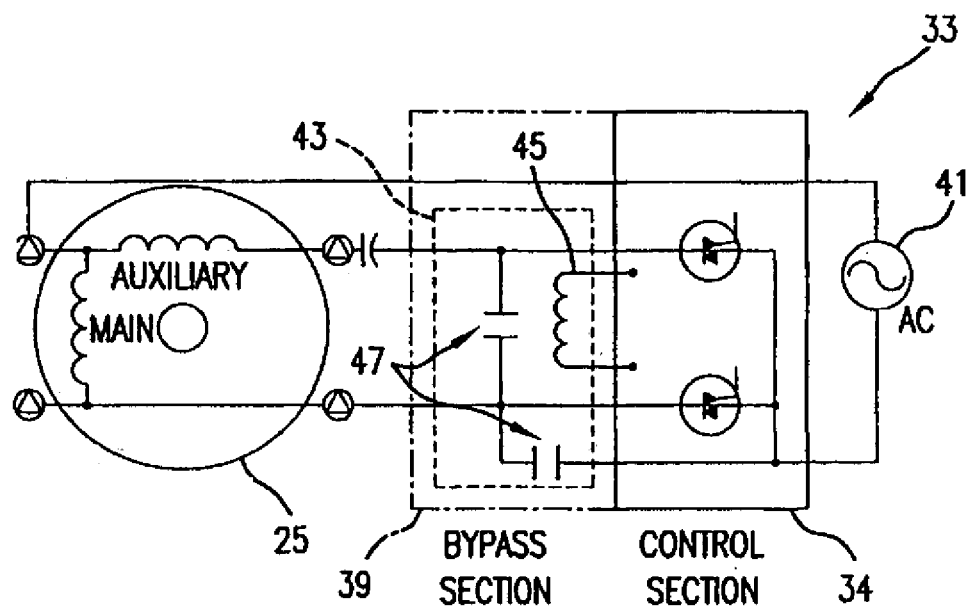
Figure 5:
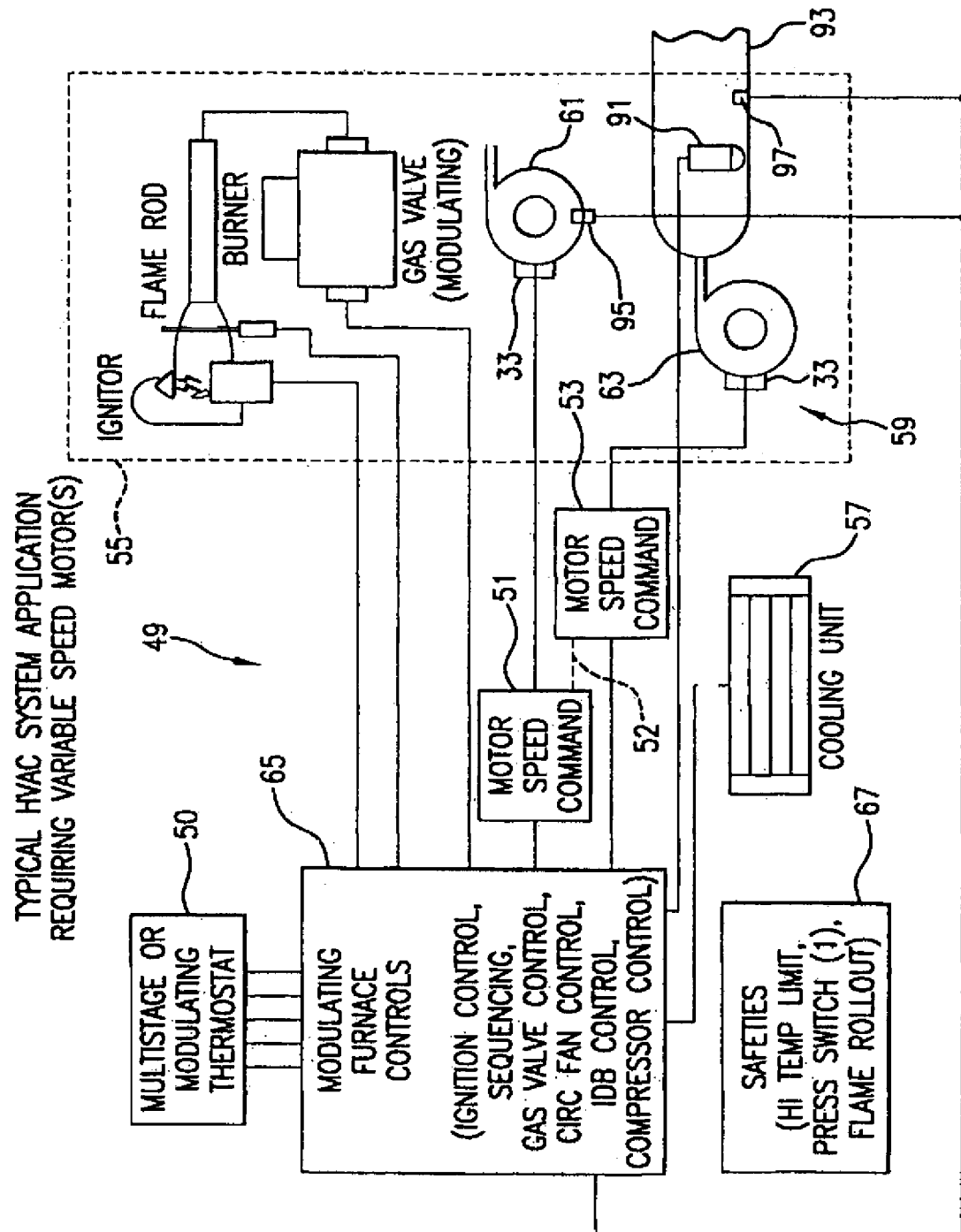
Figure 6:
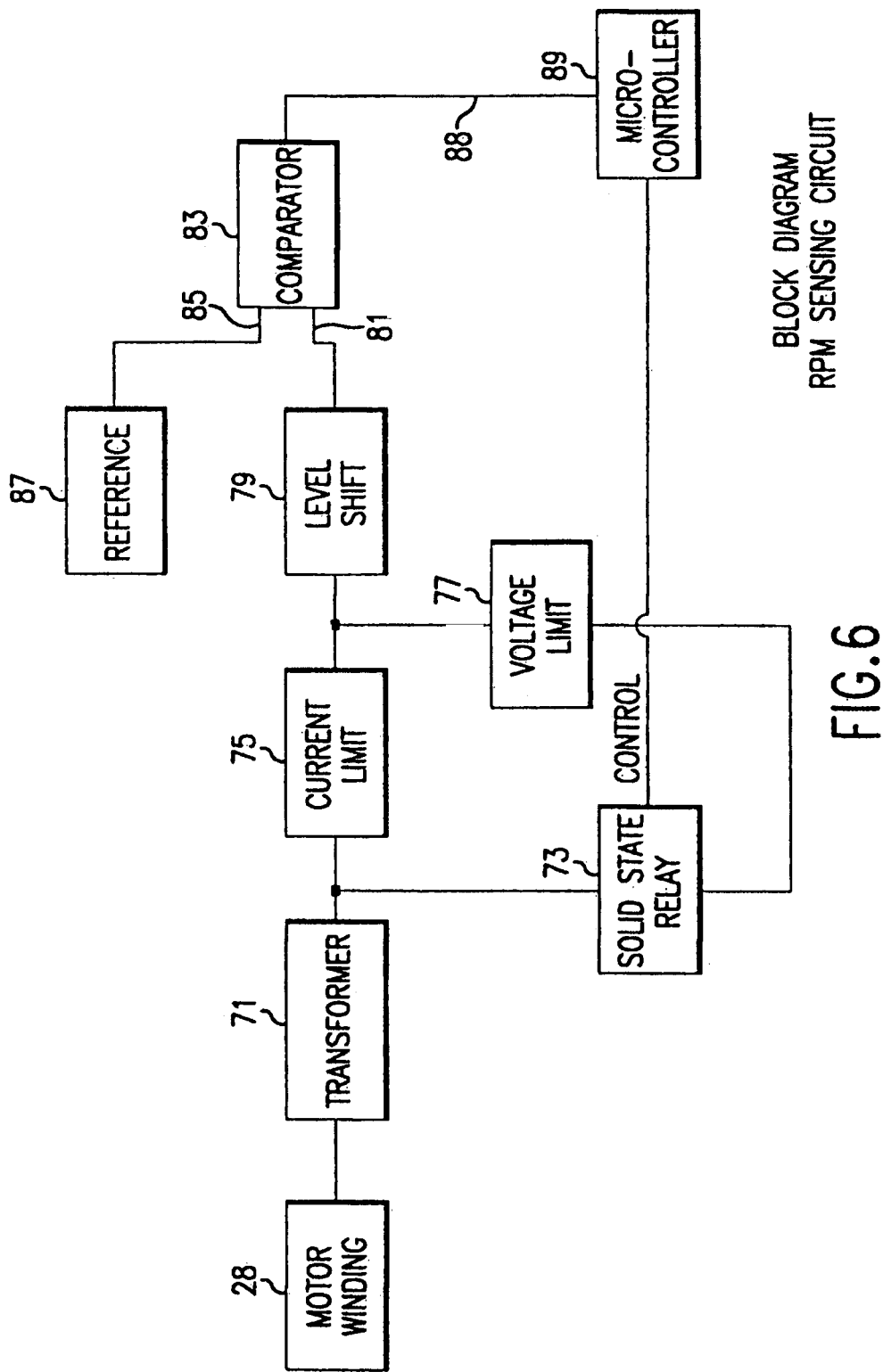
Figure 7:
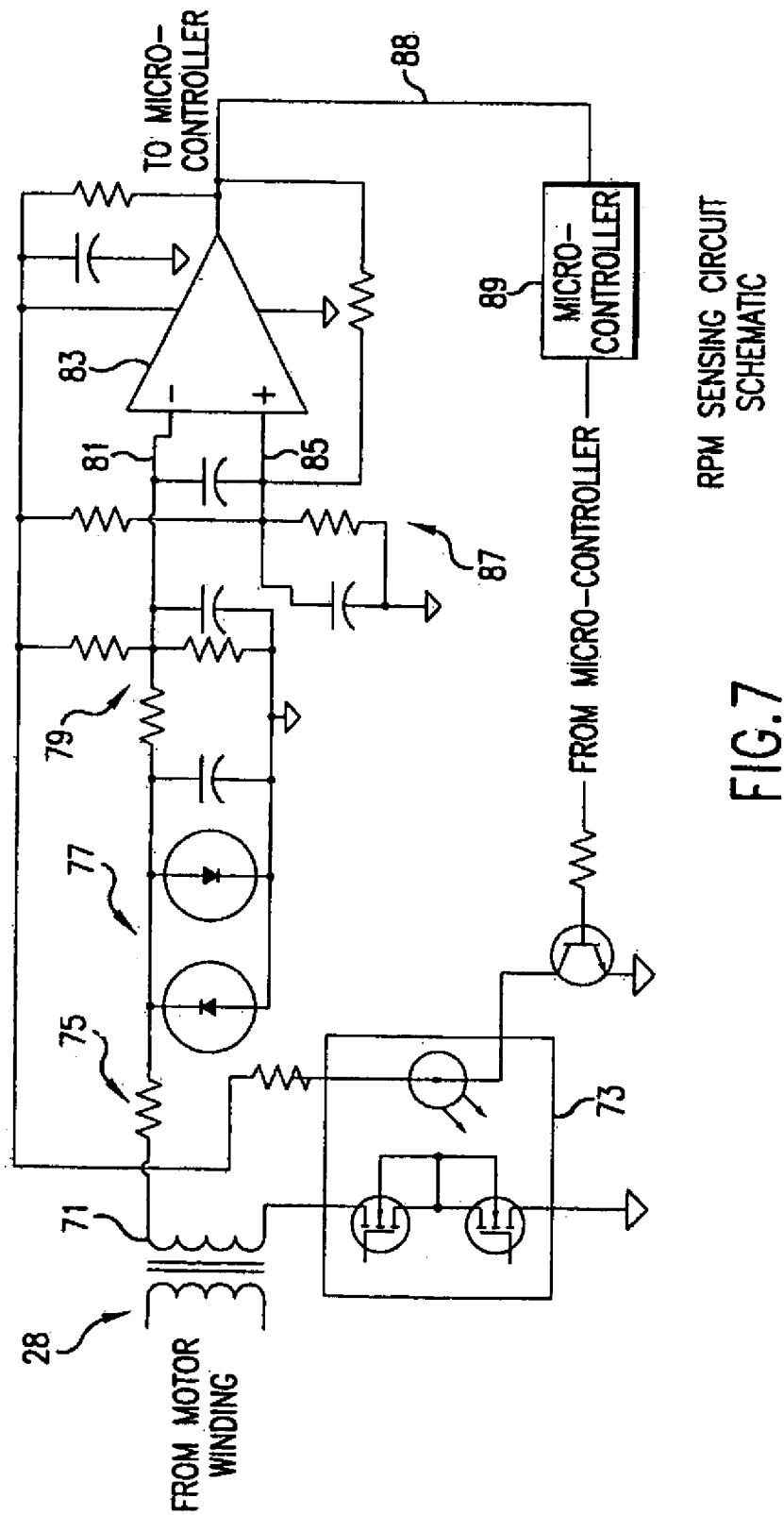
Figure 8:
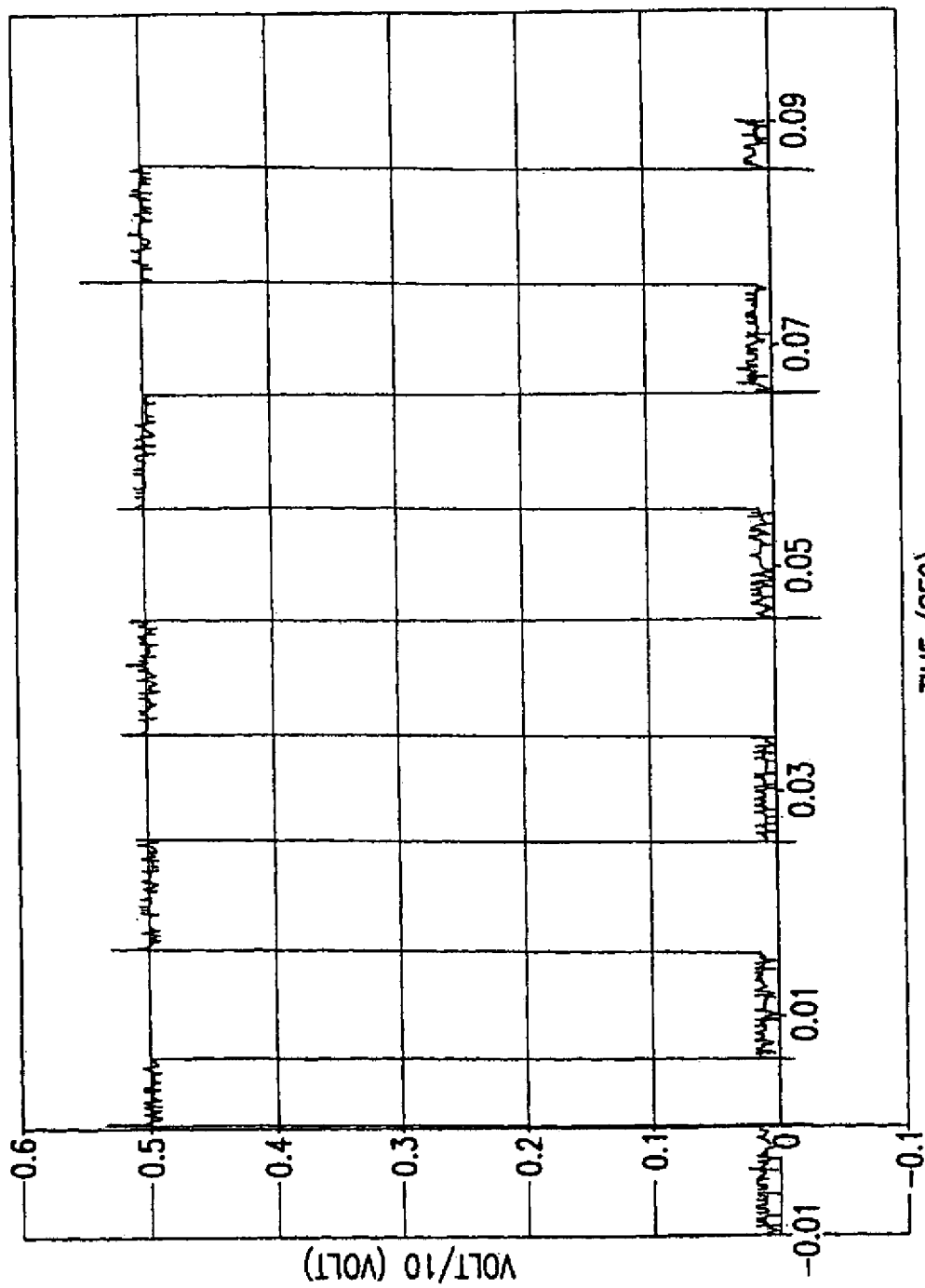
Figure 9:
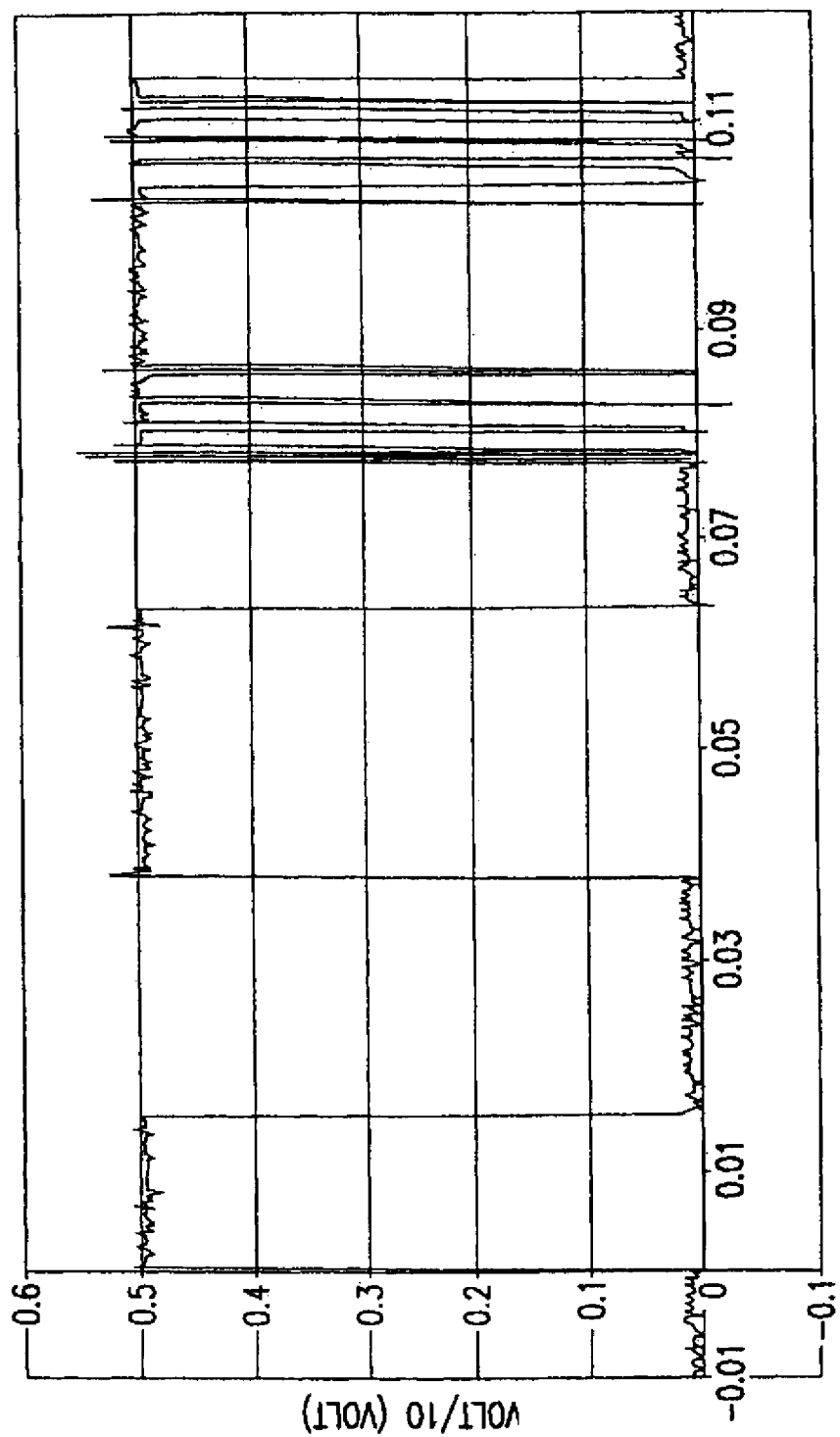
Figure 10:
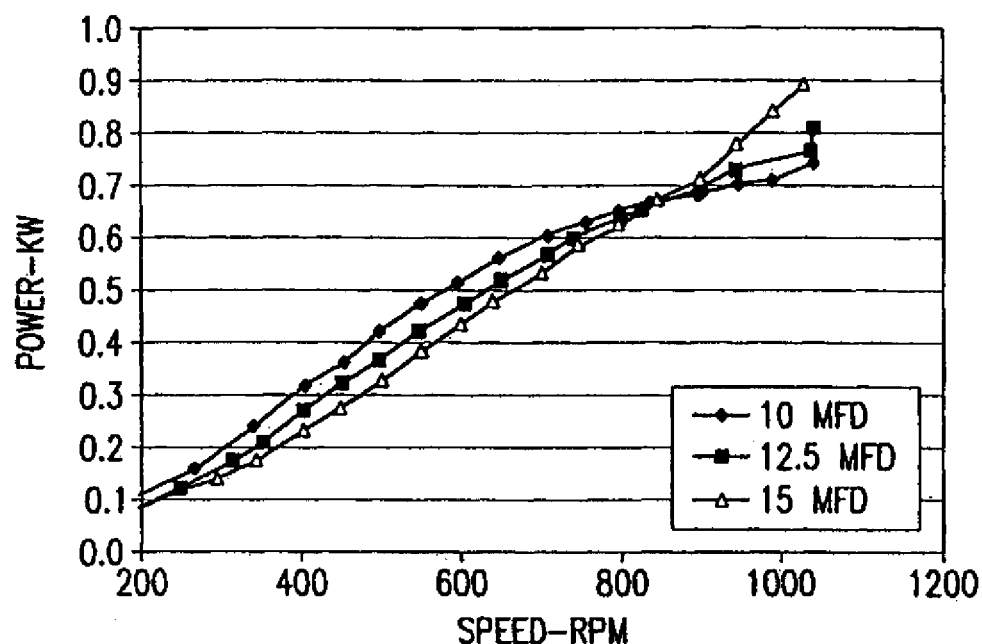
Figure 11:
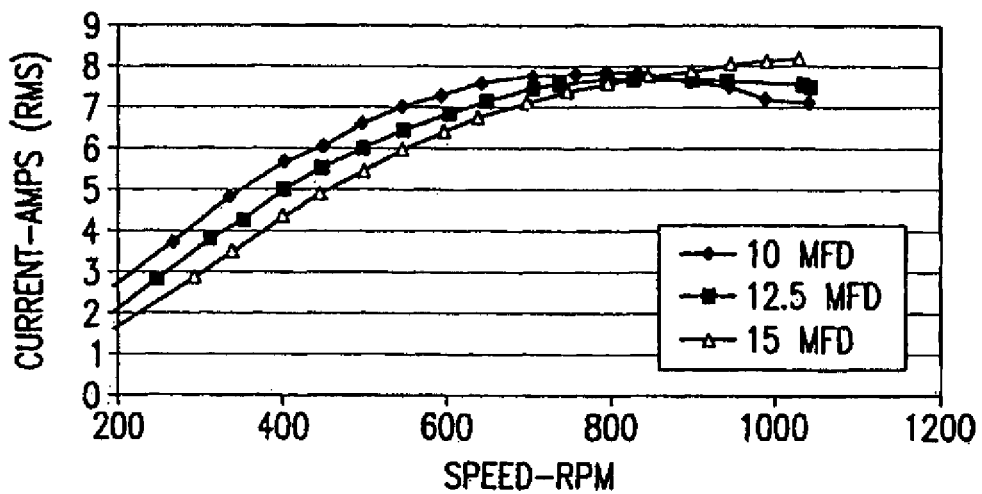
Figure 12:
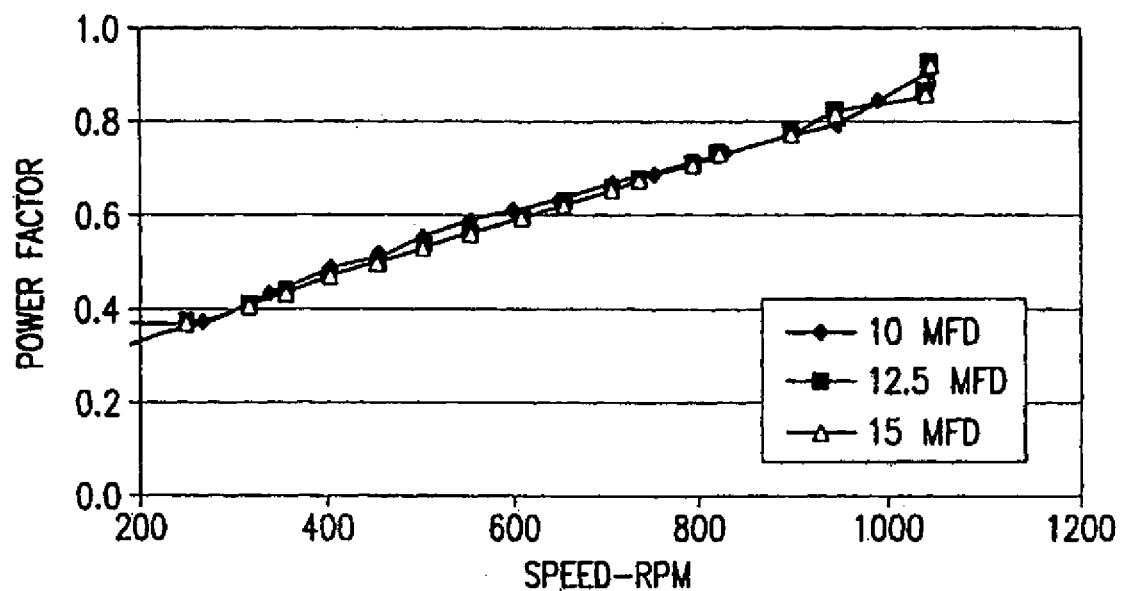
Figure 13:
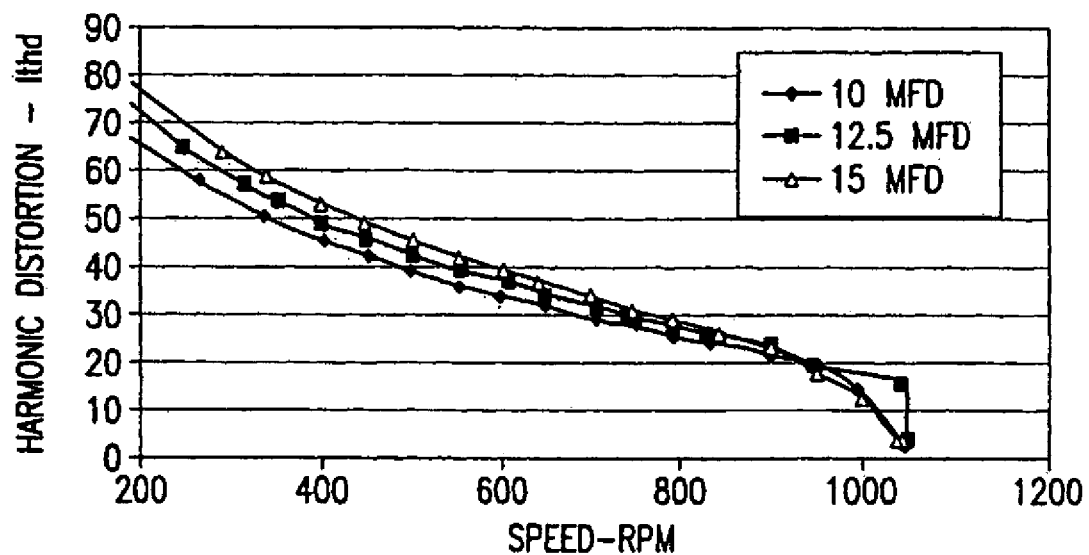
Figure 14:
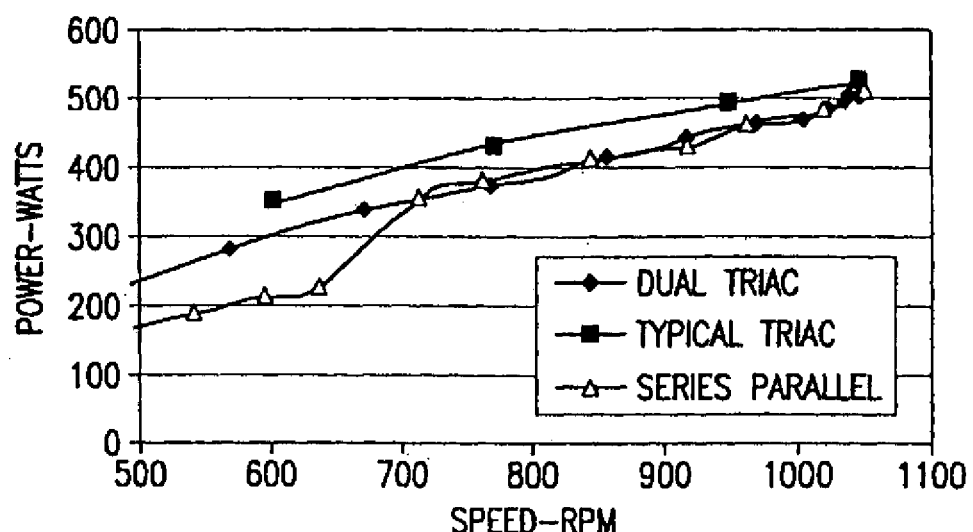
Figure 15:
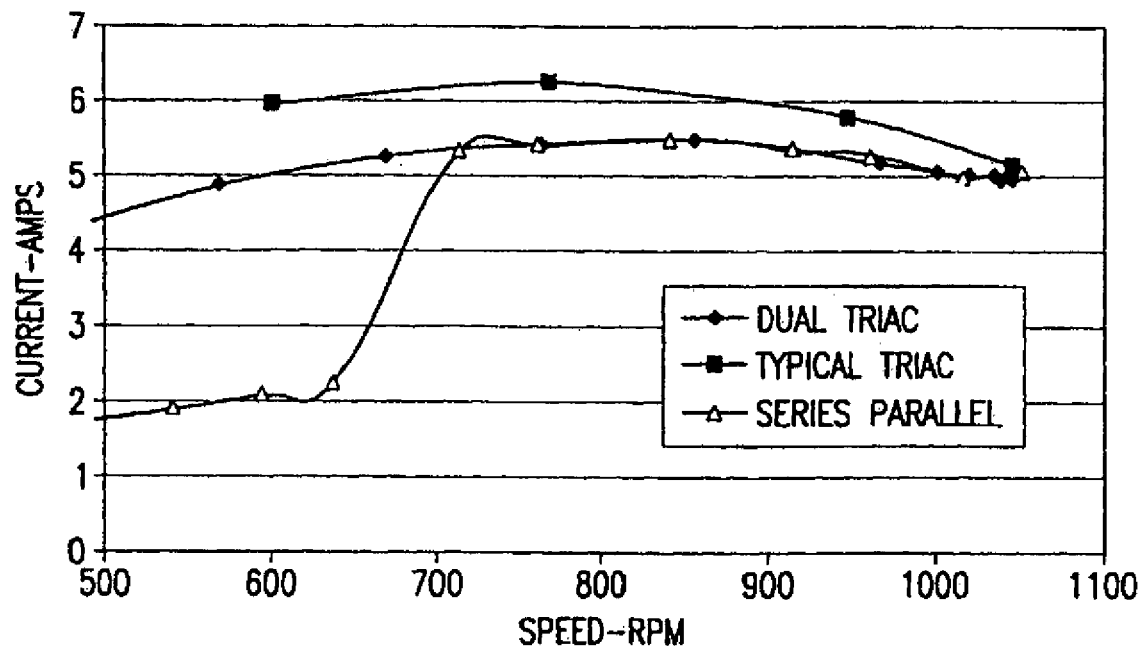
Figure 16:
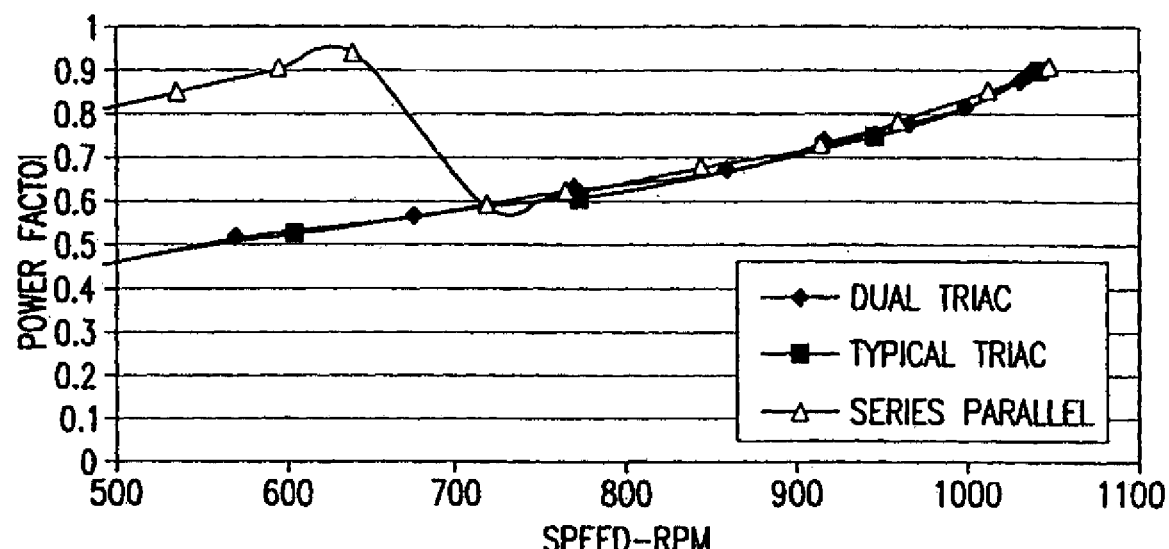
Figure 17:
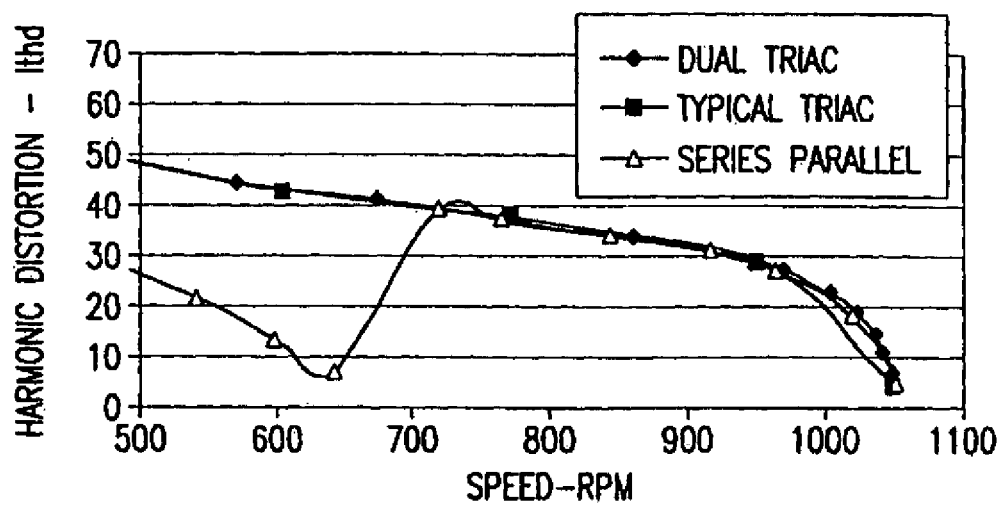
Figure 1A:
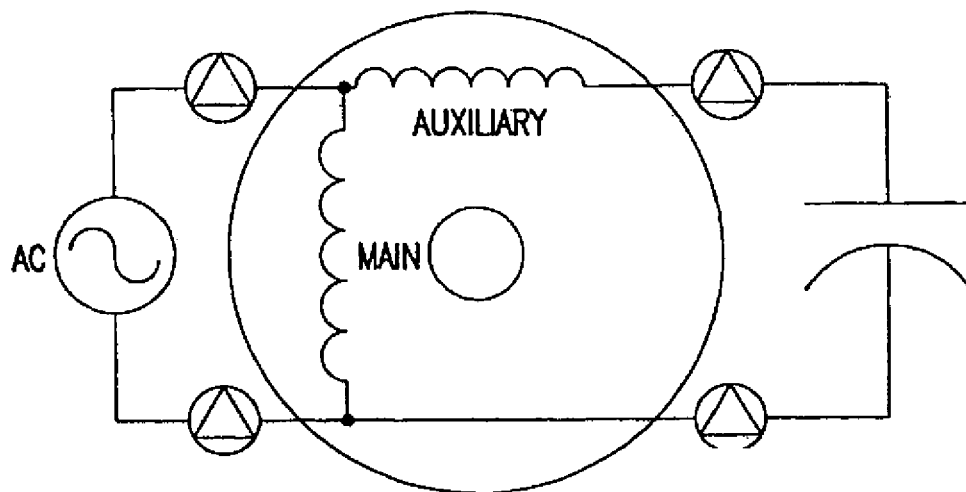
Figure 1B:
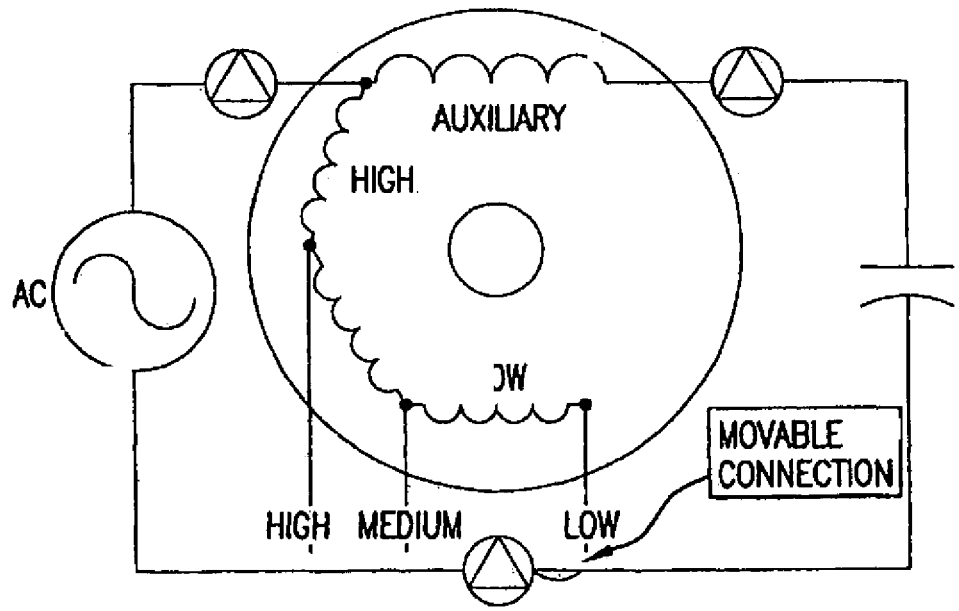
Figure 2:
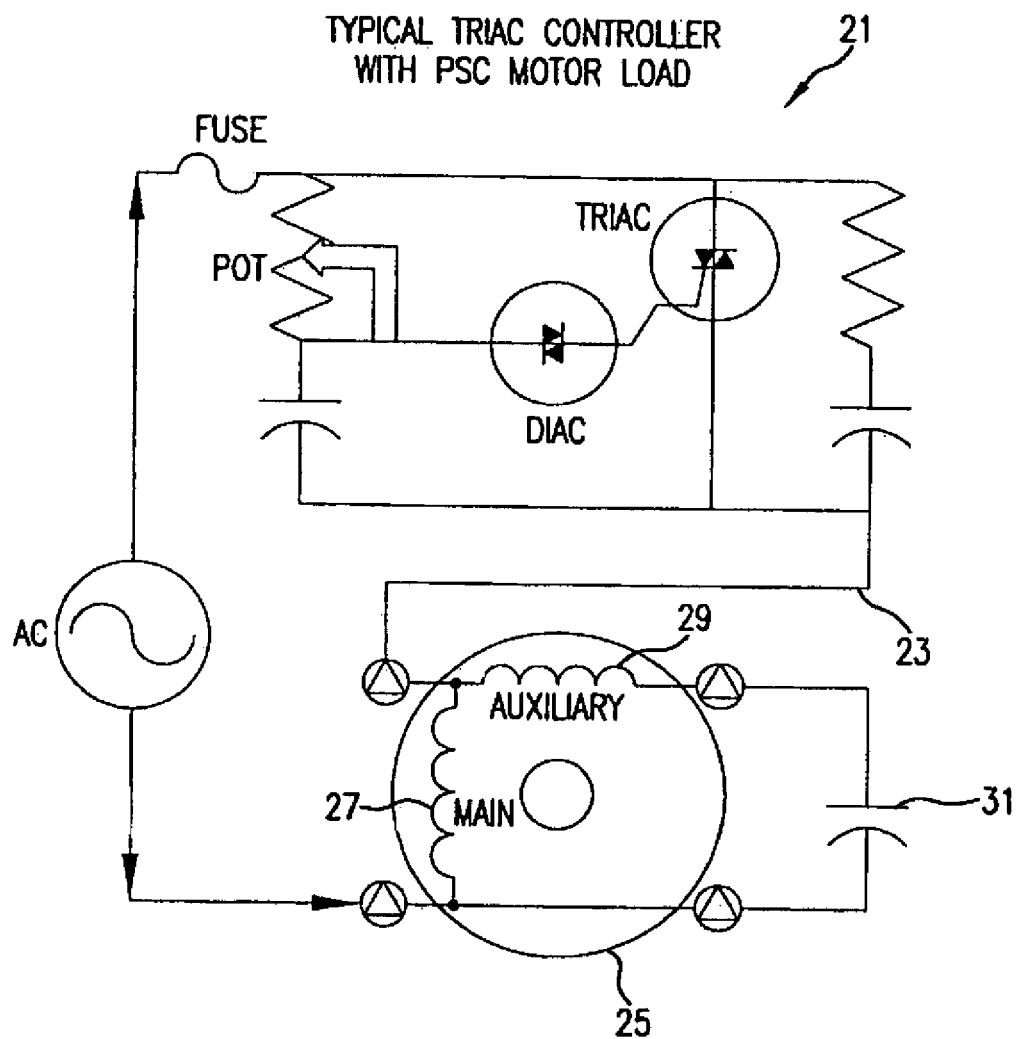
Figure 3:
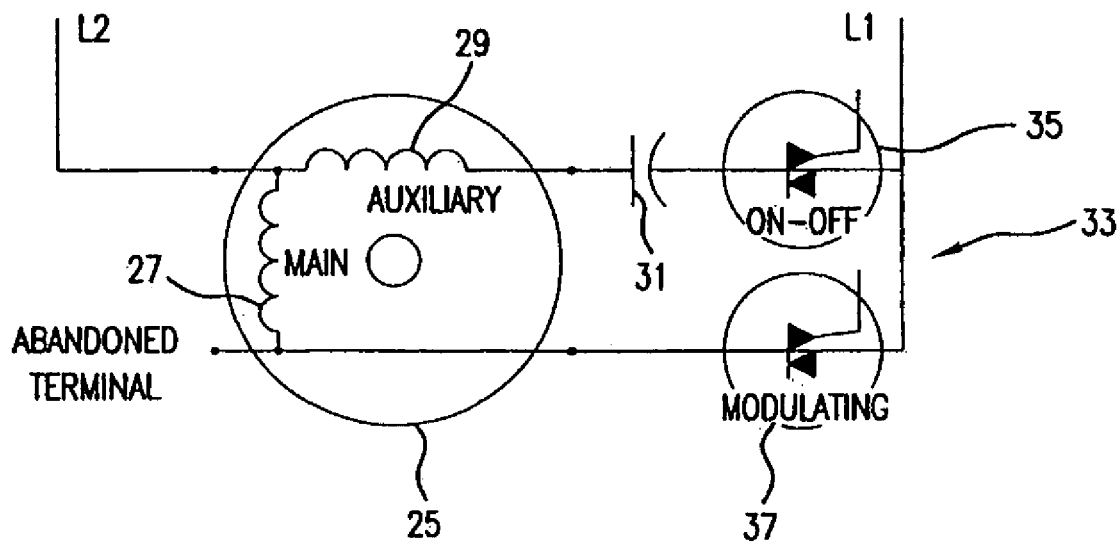
Figure 4:
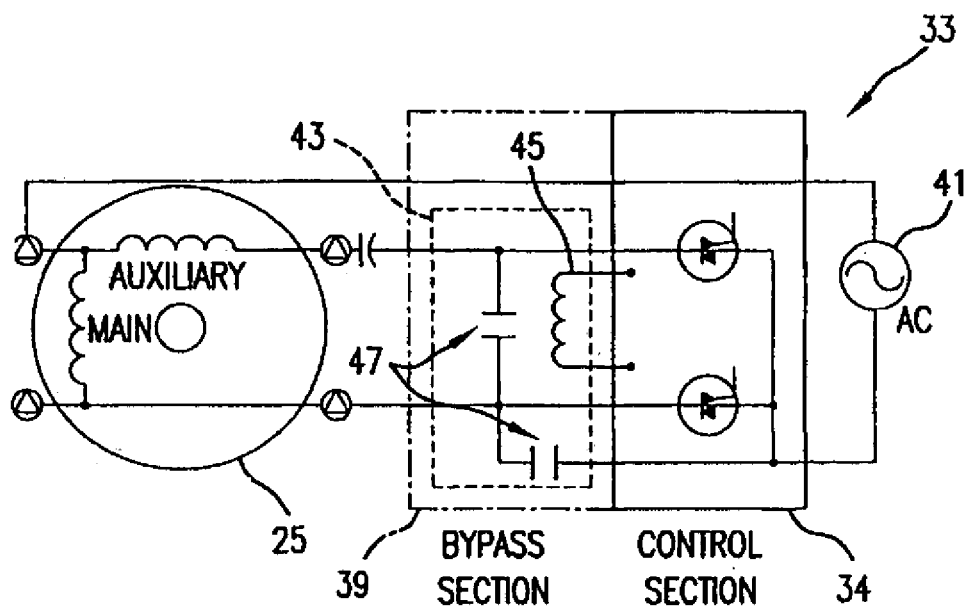
Figure 5:
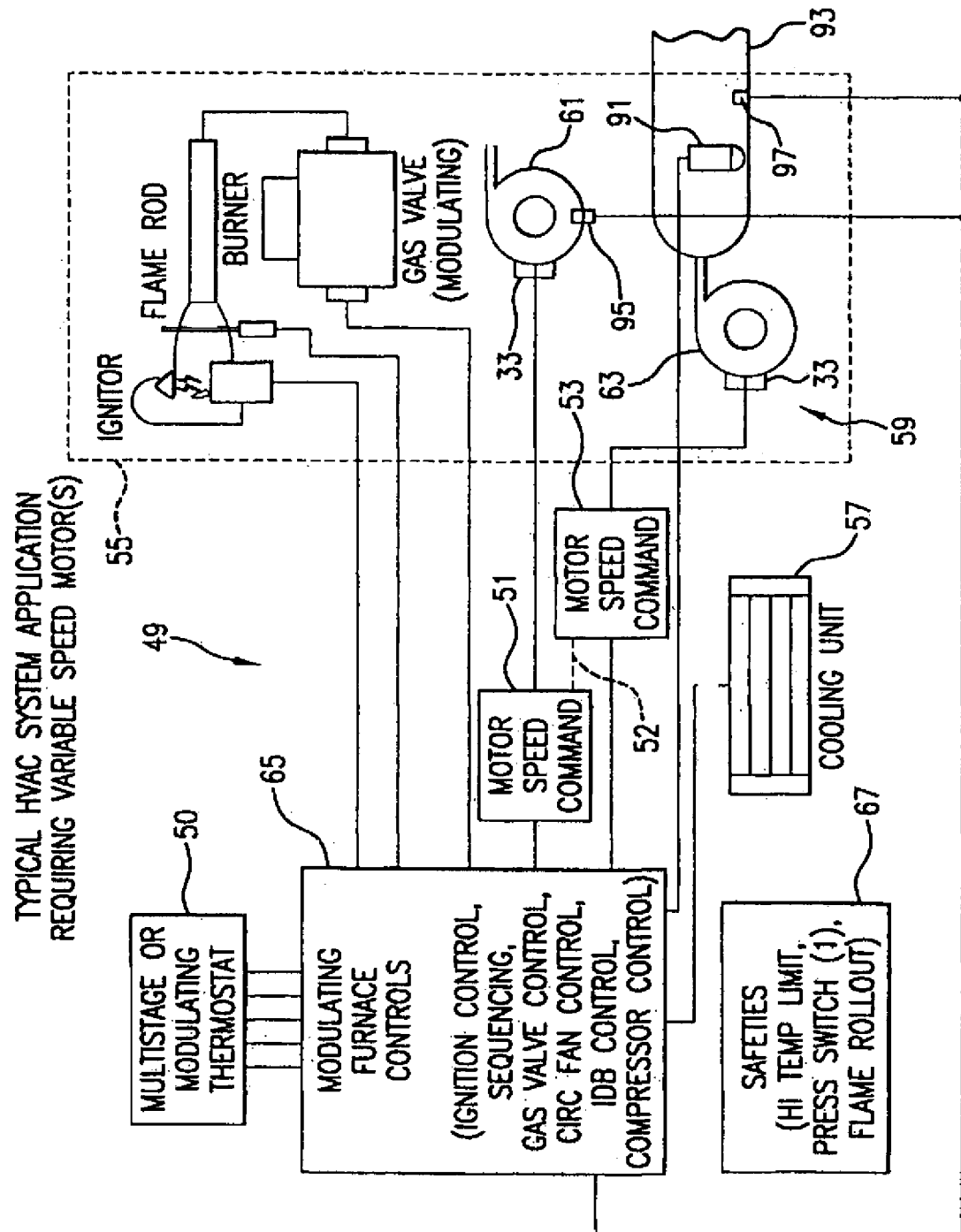
Figure 6:
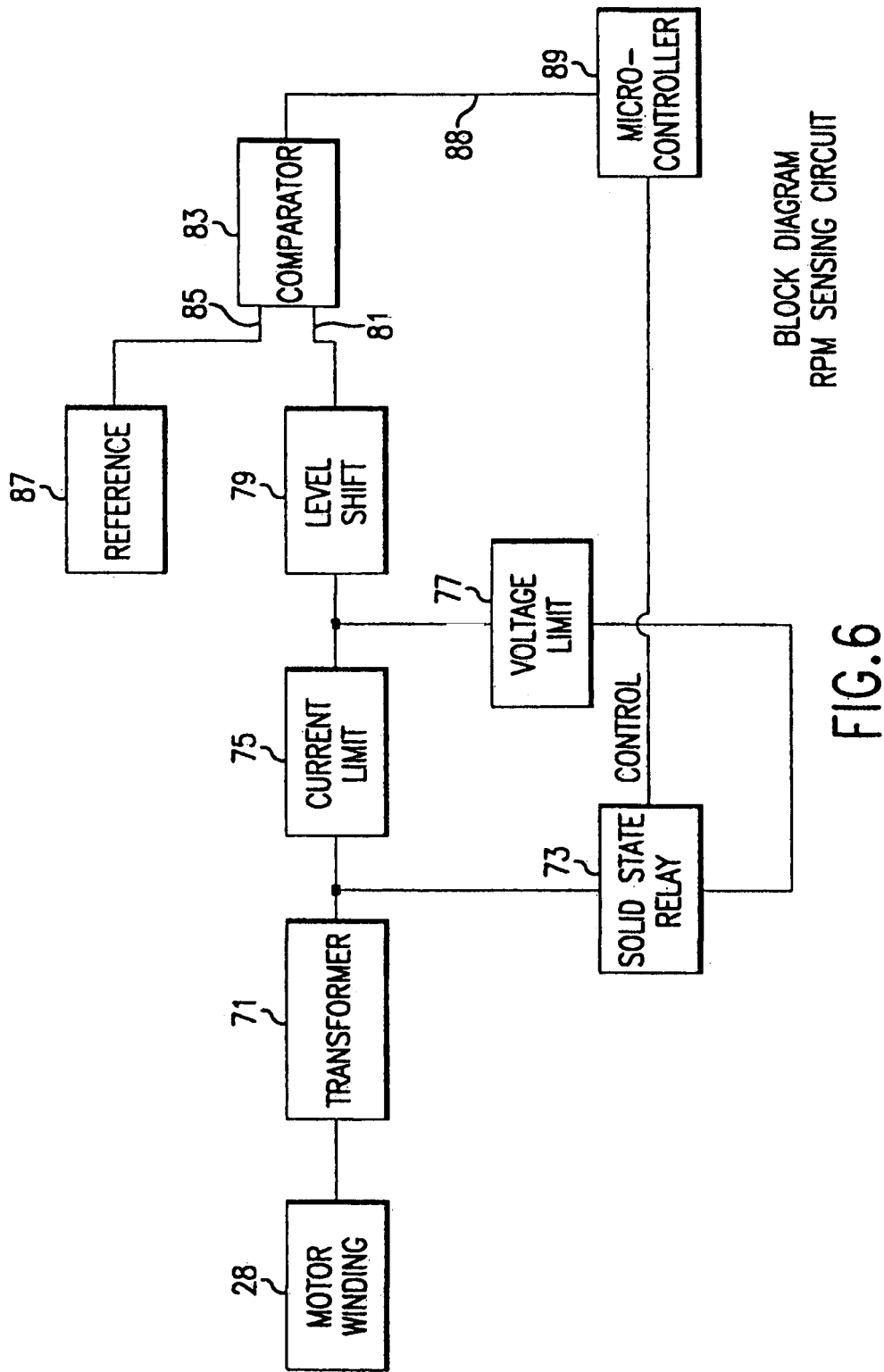
Figure 7:
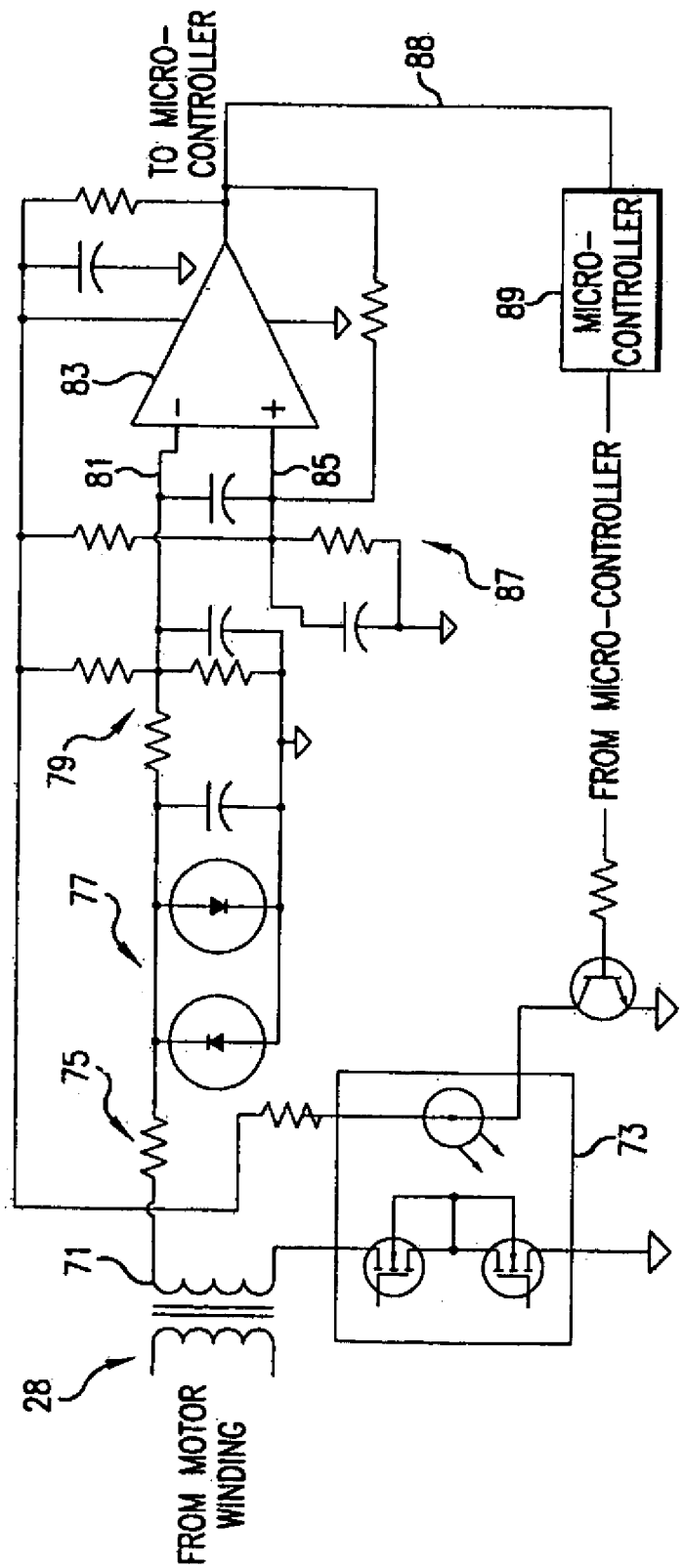
Figure 9:
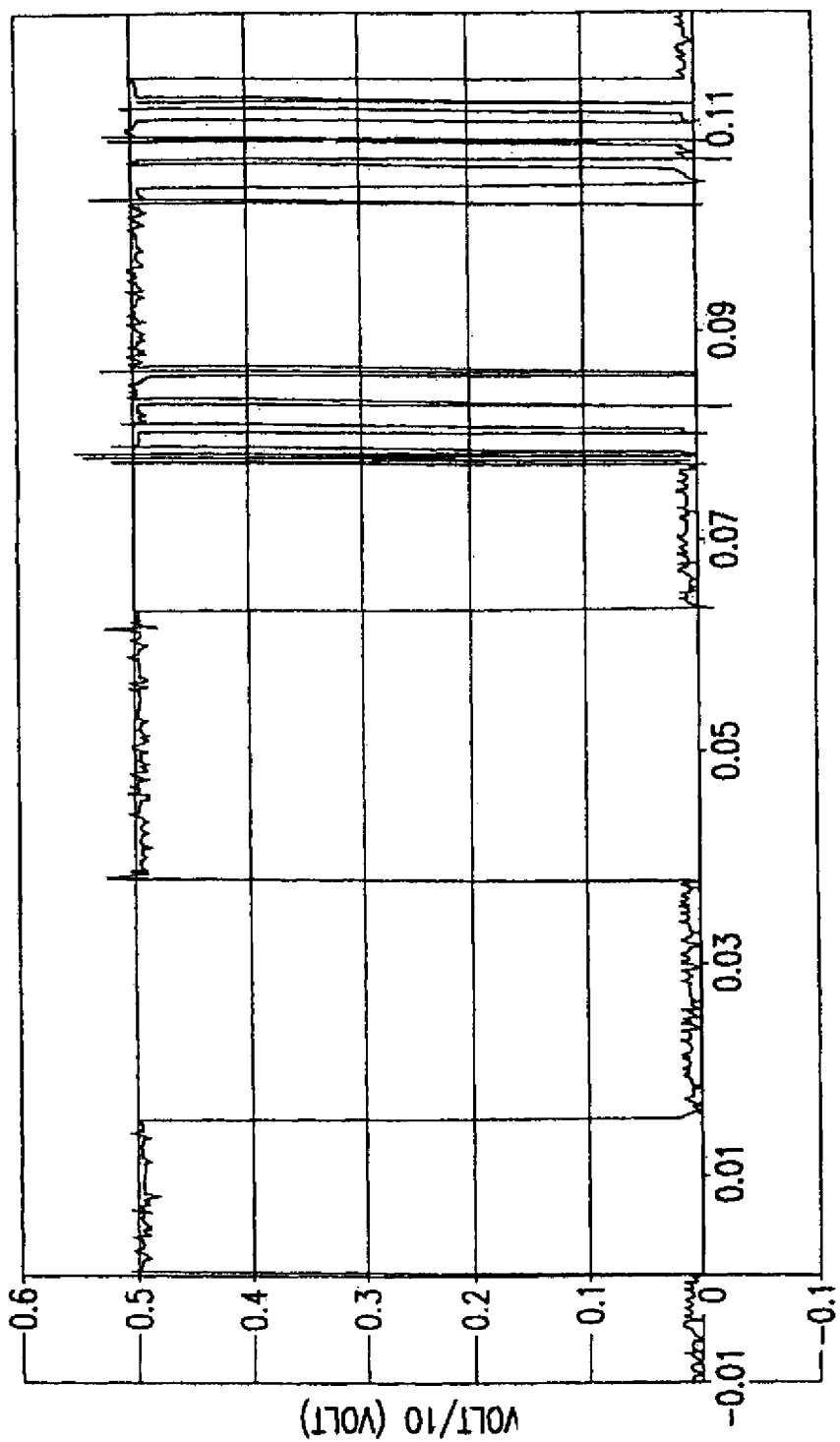
Figure 10:
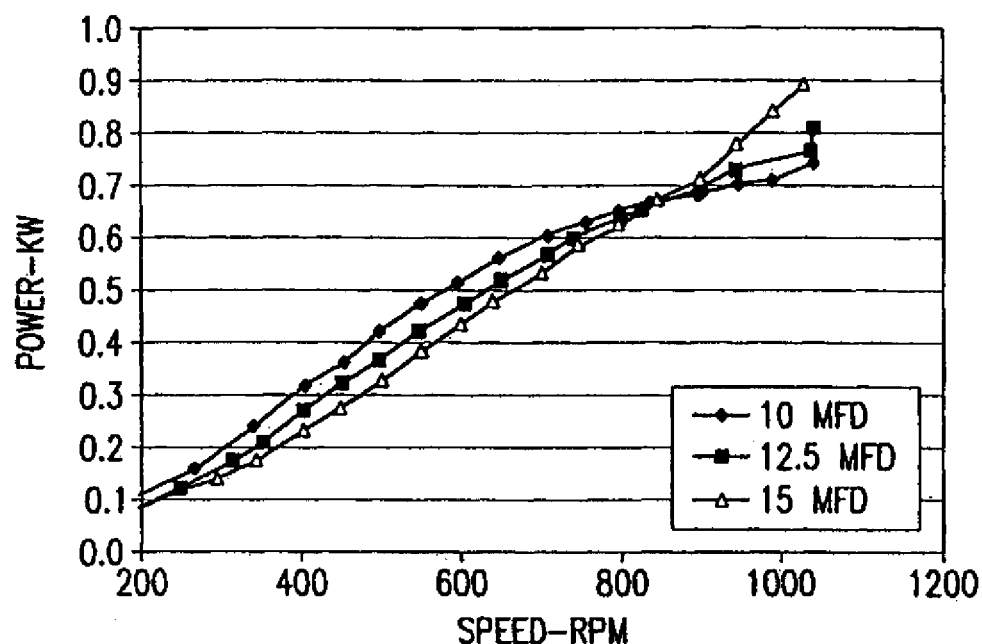
Figure 11:
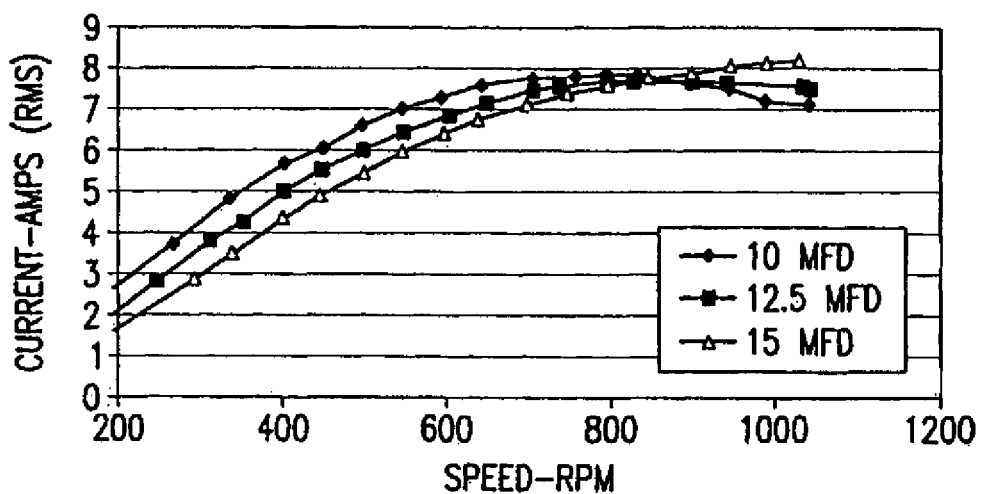
Figure 12:
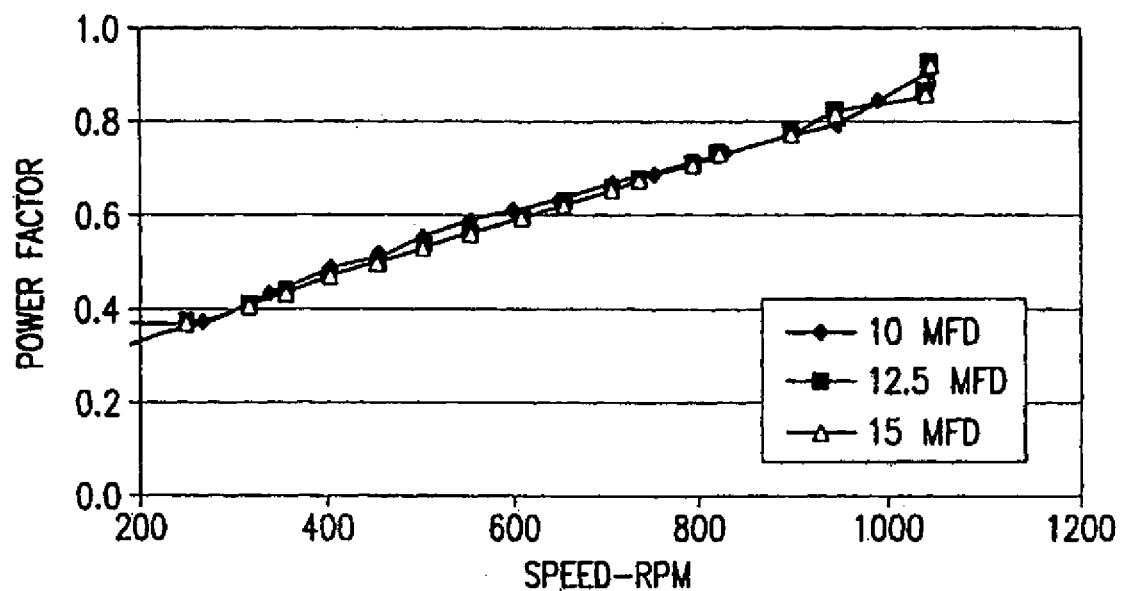
Figure 13:
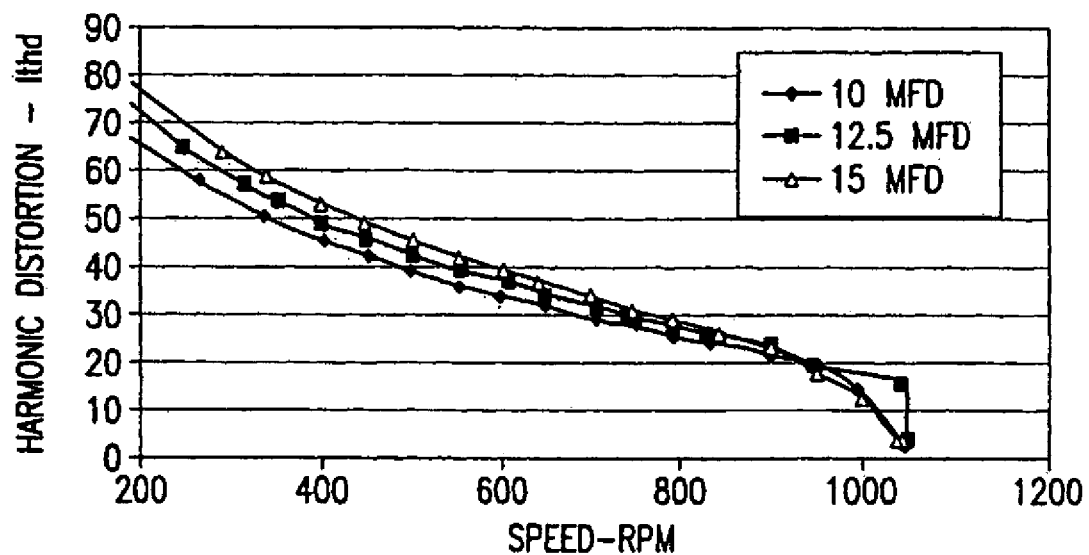
Figure 14:
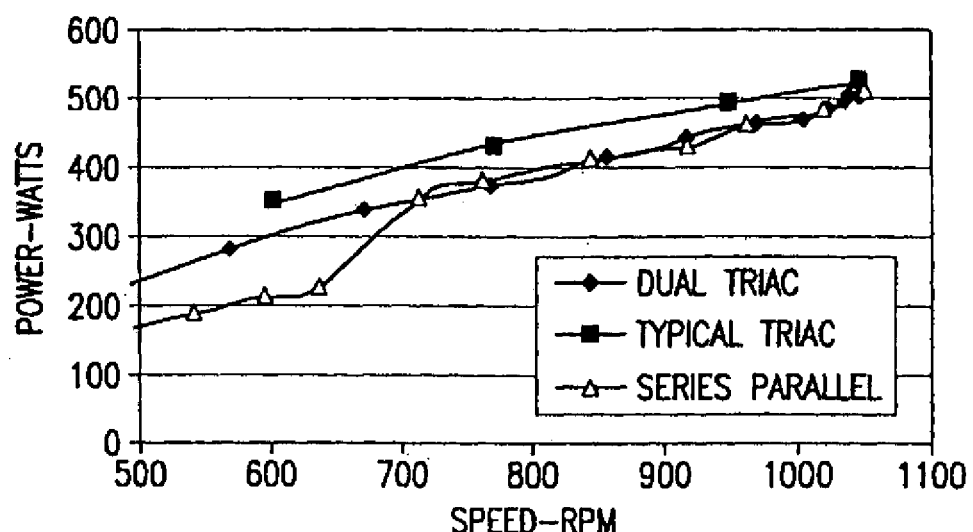
Figure 15:
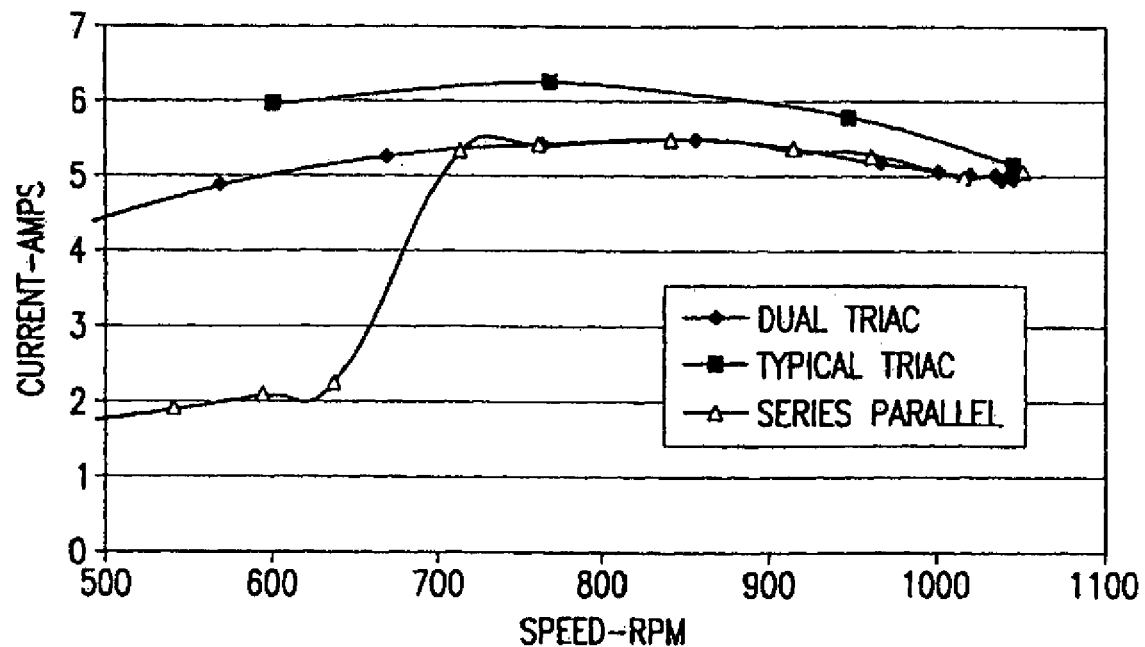
Figure 16:
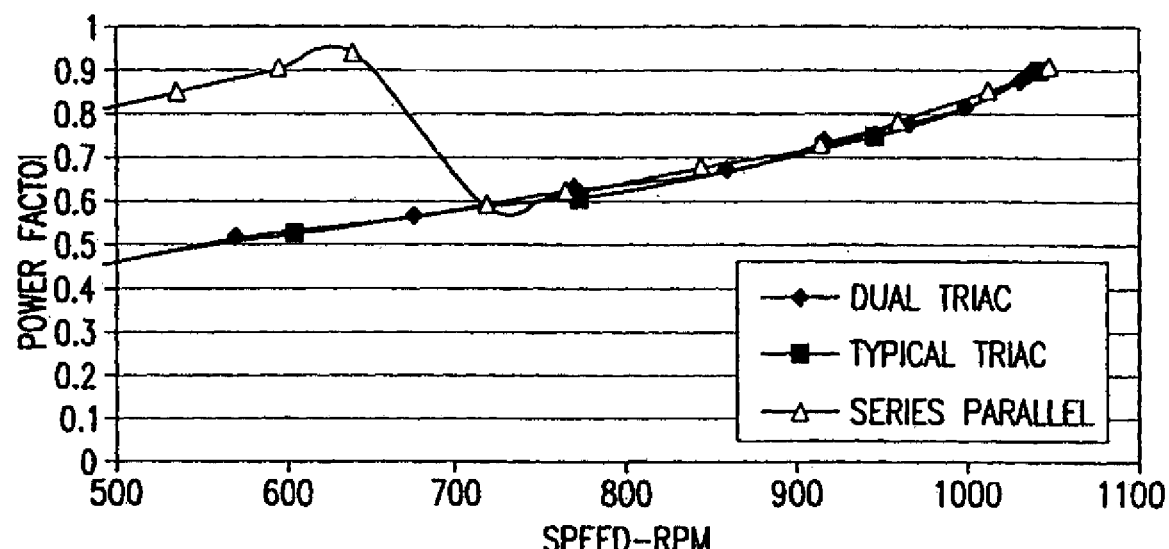
Figure 17:
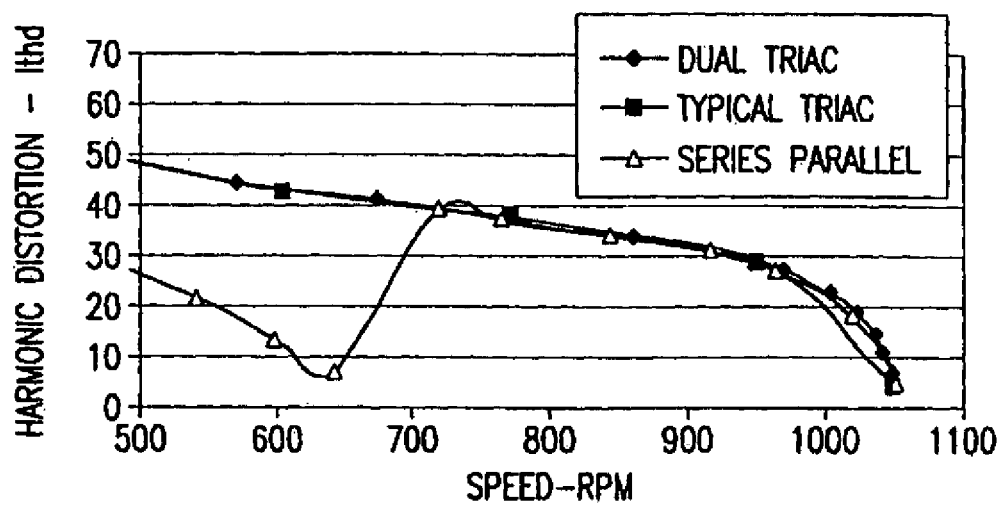

Another means of determining airflow is to know the relationship between RPM and static pressure. According to the fan laws, air movement (in CFM) is proportional to RPM, all other factors being held constant. In addition, static pressure is proportional to the RPM raised to the second power. It follows that, for a specific application, if any two of these factors are known, the third can be determined from the known relationship (e.g., see FIG. 18). A means of RPM calculation has been shown herein. A static pressure sensor, or sensors, e.g. schematically illustrated at reference number 97, may be located in the duct 93 (FIG. 5), although the sensor can be placed otherwise where desired. This method may also be specific to the particular motor/blower combination, but, as with the previously discussed control technique, can yield comparable results when used as follows:

Airflow can also be determined from the known relationship between differential pressure and RPMs. By using a low differential pressure solid-state sensor, or sensors, e.g. schematically illustrated at reference number 95 located at the induced draft blower 61 (FIG. 5), a differential pressure can be determined between two pressure (or vacuum) sources such as inside and outside of the induced draft blower 61. In an induced draft (negative pressure) application, one side is referenced to atmospheric pressure and the other side is referenced to the pressure (or vacuum) within the blower assembly. Using this information and the RPM data, the airflow can be determined from the known relationship. For example, it can be seen from FIG. 18 that this relationship is substantially linear over an operating range of the motor.

Using the RPM sensing method, as described herein, or with other sensing means, the motor speed can be sensed and controlled to a desired set point. The static pressure can also be measured at the same time. The RPM and static pressure measurement can then be used to determine air flow. Three operational modes may be made available:

1. The air flow can simply be measured without attempting to further control it.
2. The air flow input can be preset and maintained at the desired set point.
3. The air flow can be controlled at a set point that is proportional to the controller input signal.

Using the RPM sensing/control methodology previously described, as well as the static pressure from a pressure sensor, e.g. 97, in the duct 93 (FIG. 5) the airflow can thus be measured and/or controlled.

Another method of determining airflow is by use of data for the air velocity, the air density, and the flow area. Velocity pressure is expressed by the equation:

$$P_v = dV^2/2Gc \qquad [\text{Eq. 2}]$$

Where d=density, $Kg/m^3$
  V=average duct velocity, m/s
  Gc=a dimensional constant, 1 $Kgm/N*S^2$
For air at standard conditions (1.204 $Kg/m^3$)

$$P_v = 0.602\ V^2, \text{ or } V = (P_v/0.602)^{1/2} \qquad [\text{Eq. 3}]$$

Flow rate can thus be calculated from the equation $$Q = VA, \text{ or by substitution, } Q = A*(P_v/0.603)^{1/2} \qquad [\text{Eq. 4}]$$

It is obvious from this equation that these parameters do not pertain to the motor/controller/blower combination, but rather to the duct through which the air is flowing. This methodology therefore makes airflow measurement and control independent of the motor, the blower, and the combination thereof. No factory programming would be required to set up the RPM/static pressure (or torque) relationship to air volume movement, hence, this would be generally uncomplicated to apply.

In some applications, the objective is to maintain constant static pressure. A typical example might be a zoned system where multiple dampers might open or close thus changing both the airflow and the static pressure in the ductwork. Using a static pressure sensor, e.g. 97, downstream of the blower motor, e.g. 63, (FIG. 5) for input to the motor controller, the blower speed can be controlled so as to maintain a static pressure regardless of how many dampers are open.

A temperature sensor, or sensors, schematically illustrated at reference number 91, can be utilized with the motor speed control as shown in FIG. 5. In many applications such as furnaces and air conditioners, the discharge temperature needs to be maintained at a particular point. In heating applications, this may be to assure proper temperatures over the heat exchanger (not shown) or to avoid cold drafts. In cooling applications, it may be to avoid coil freeze-up or to maintain the discharge temperature at an optimum temperature. The temperature sensor may be used as a controller input to vary the motor speed so as to control the system at the selected temperature. If desired, two sensors can be used to measure differential temperature across two locations and control the airflow according to a predetermined program.

The controller of the present invention may be utilized with a variety of command modules for issuing control signals to the controller. The following are some of the possible methods to transmit speed information to the dual triac controller of the present invention. Other methods are possible. This invention contemplates use of the following exemplary methods in addition to any other possible method.

1) Pulse Width Modulation:

Utilizes a rectangular wave of constant frequency, in which the speed information is contained in the duty cycle. A microprocessor can measure the time duration of the "on" portion of the signal, and set the motor speed accordingly. A desired fixed frequency is 2 KHz. This frequency allows an inexpensive micro-controller to measure the on time accurately, and the measurement can be made quickly enough so that the controller can complete the output tasks. This signal can be optically isolated to mitigate grounding issues in the system.

2) Analog Linear Control Signal

The preferred embodiment is a 4–20 maDC current level, as utilized in many industrial control situations. In this embodiment, 4 maDC represents the lowest speed (or pressure, temperature, or airflow) and 20 maDC represents the highest speed (or pressure, temperature, or air flow). Other signal levels are possible. It may also be a voltage rather than a current. A micro-controller with an embedded A/D converter can digitize the signal to the required resolution to use in the speed control algorithm. It will be noted that analog signals are more difficult to isolate than digital signals if isolation is a requirement.

3) Discrete Inputs

One or more discrete inputs can be used to establish pre-set speeds. As an example, for a two heat, two cool thermostat with a manual fan speed:

| | |
|---|---|
| High cool - | 1075 RPM |
| Low cool - | 900 RPM |
| High heat - | 800 RPM |
| Low heat - | 650 RPM |
| Recirculation - | 400 RPM |

4) Variable Frequency Modulation:

This is similar to the pulse width modulation technique, except that control will be based on the frequency of the input signal. Instead of the controller decoding a pulse width (rising edge to falling edge) the controller will instead measure a frequency (rising edge to rising edge). Like the pulse width modulation scheme, this input can be optically isolated.

5) Discrete Up/Down Pulses.

Two signals can be provided, one commanding the motor to increase its speed and one commanding the motor to decrease its speed. These signals can be generated by a mechanically actuated switch on the controller, or could be generated by the main furnace control unit.

The inventors have further found that the use of different size capacitors can be used as a means of optimizing performance at a particular operating point can be beneficial in cases where the motor is most likely to be operated at that speed much of the time. FIGS. 10–13 show the impact of changing capacitor size on four key performance criteria: power, current, power factor, and harmonic distortion. As can be seen from the graphs, a larger capacitor decreases the power and current draw at reduced speeds although it increases power and current draw at full speed. At the same time, a larger capacitor lowers the power factor and increased harmonic distortion somewhat at low speeds. In motor applications intended to operate at reduced speed most of the time, a larger capacitor is preferred according to certain aspects of the present invention for utilization with the controlled motor.

Figure 10:
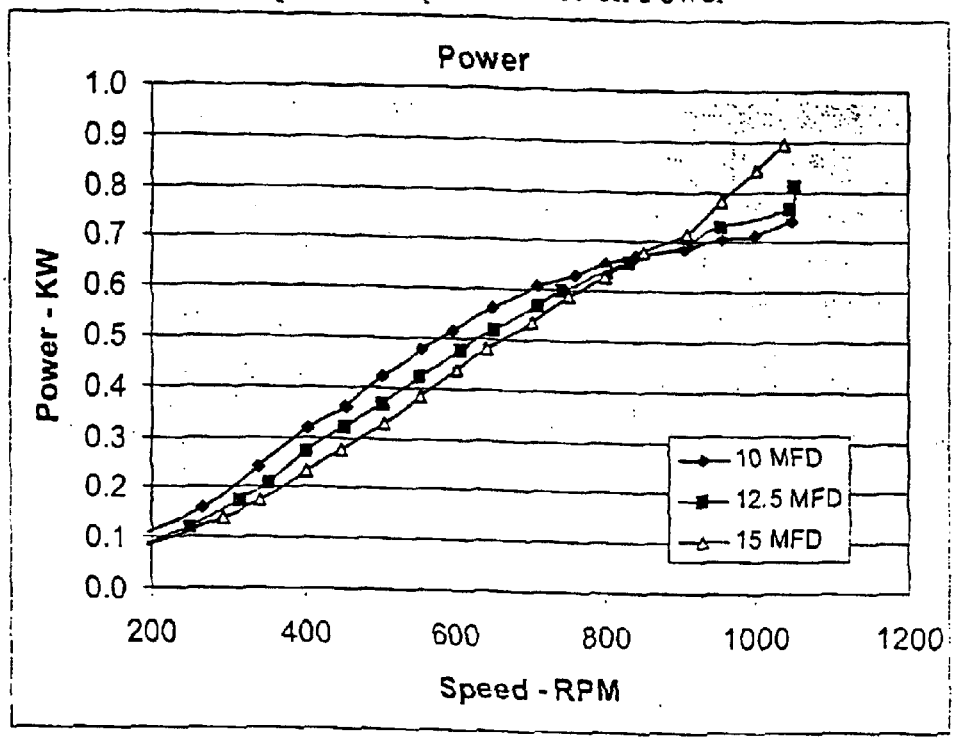
FIGS. 10–13 show the impact of changing capacitor size on four key performance criteria: power; current; harmonic distortion; and power factor.
Figure 11:
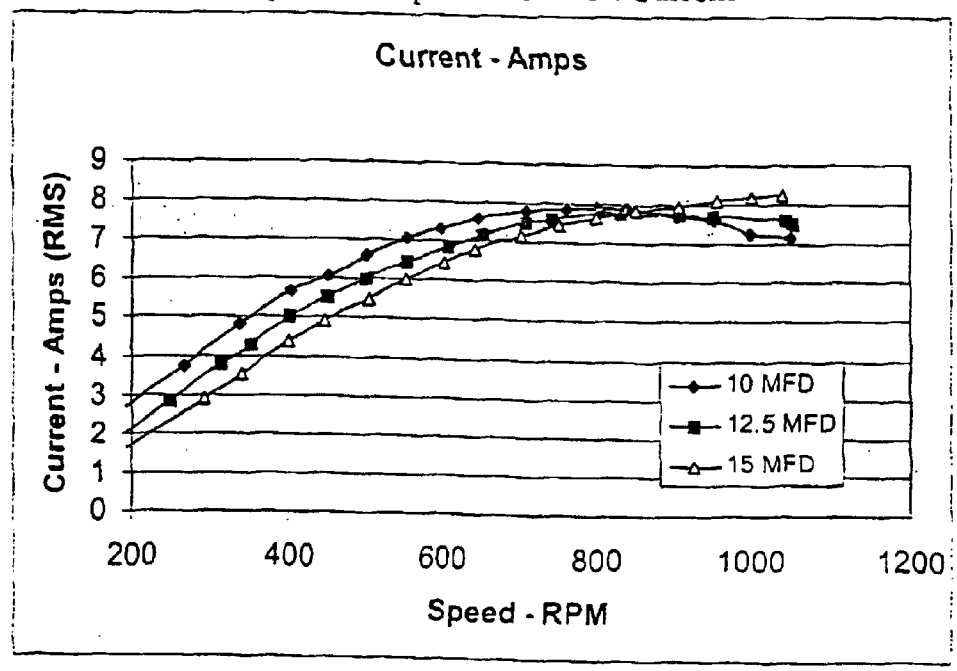
Figure 12:
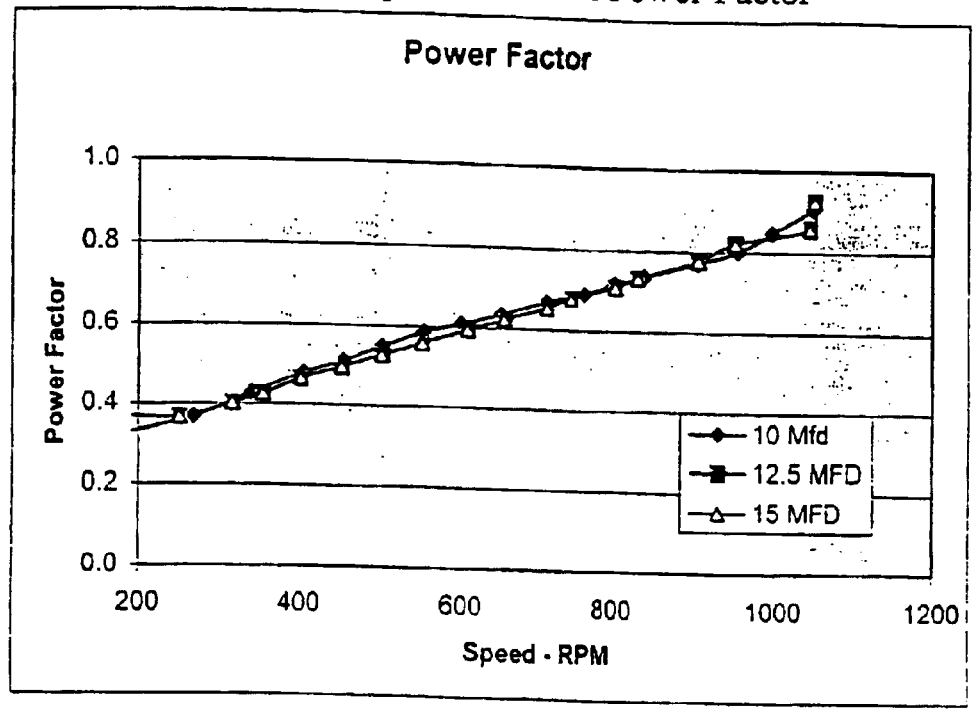
Figure 13:
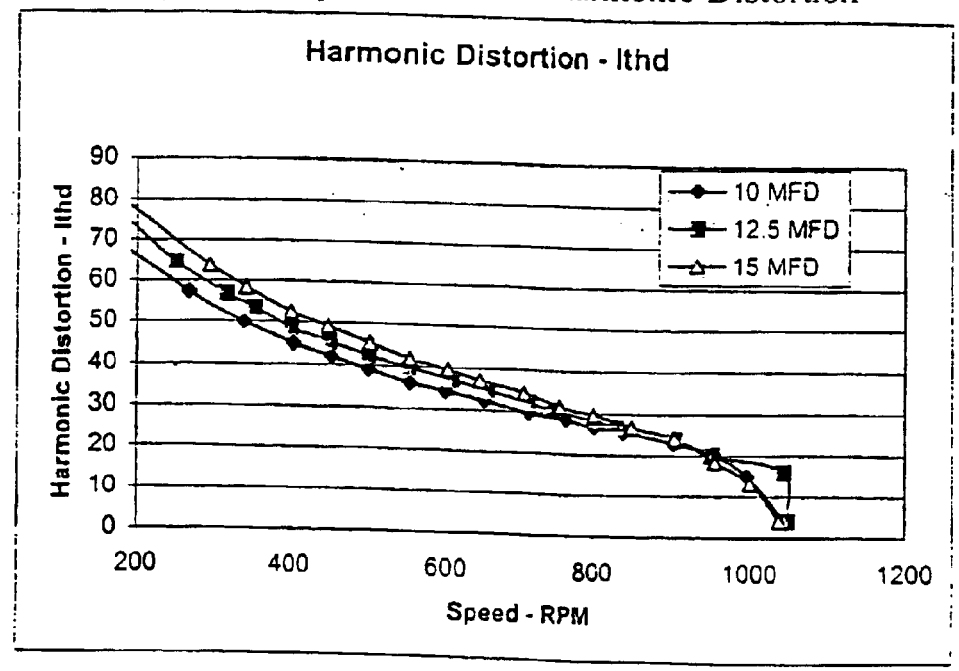
Figure 14:
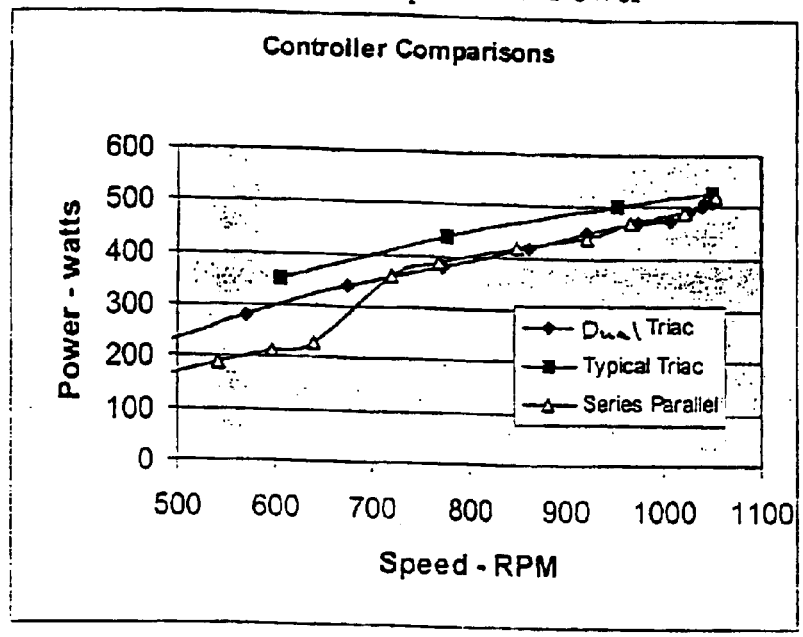
FIGS. 14–17 show results for three different types of triac controls.
Figure 15:
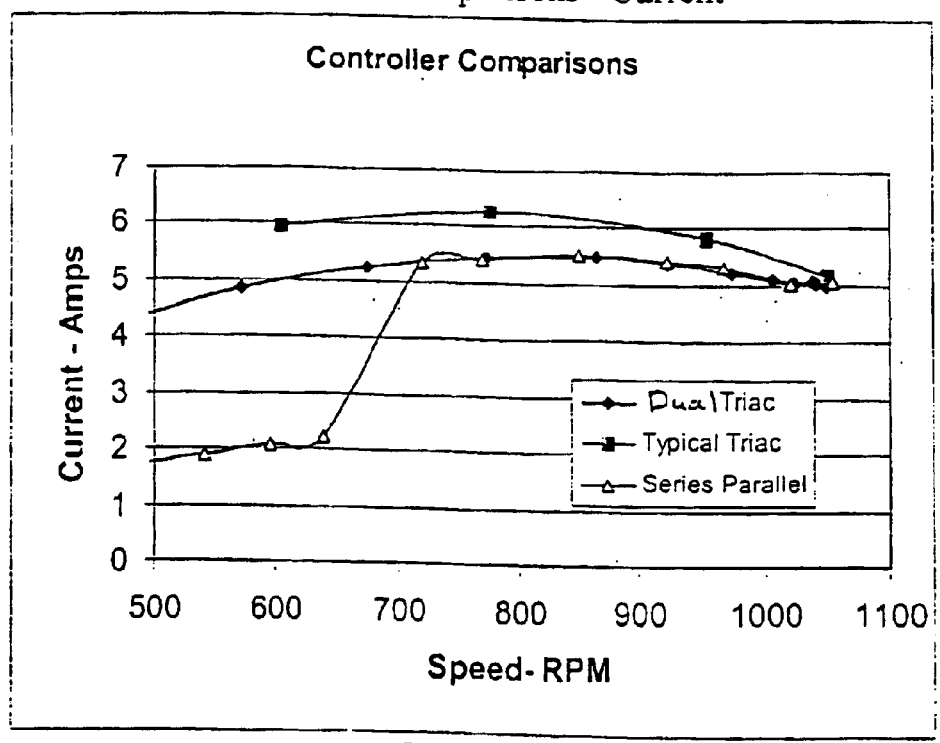
Figure 16:
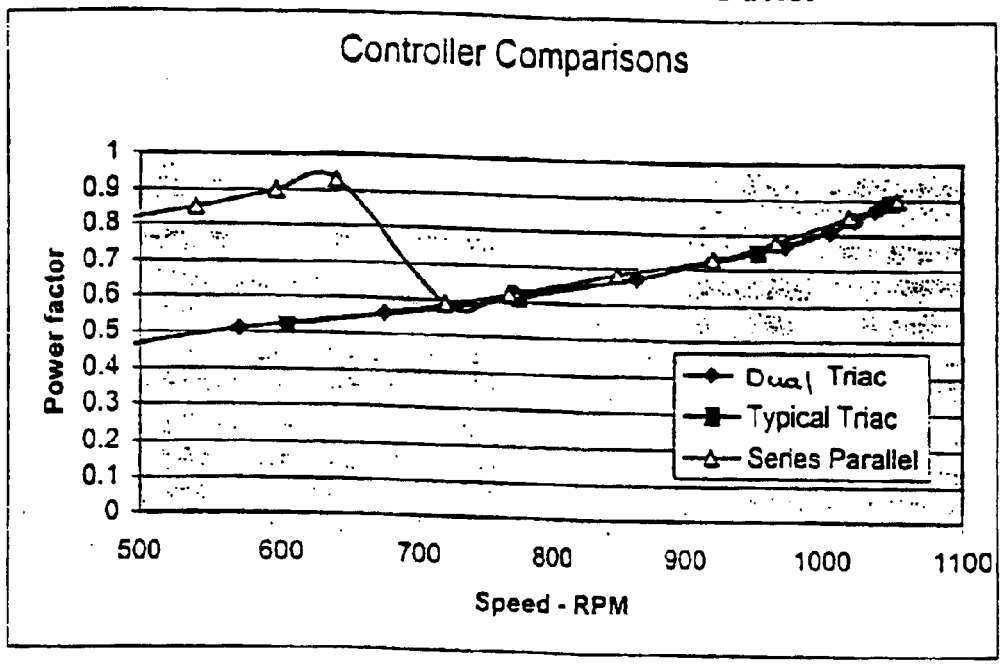
Figure 17:
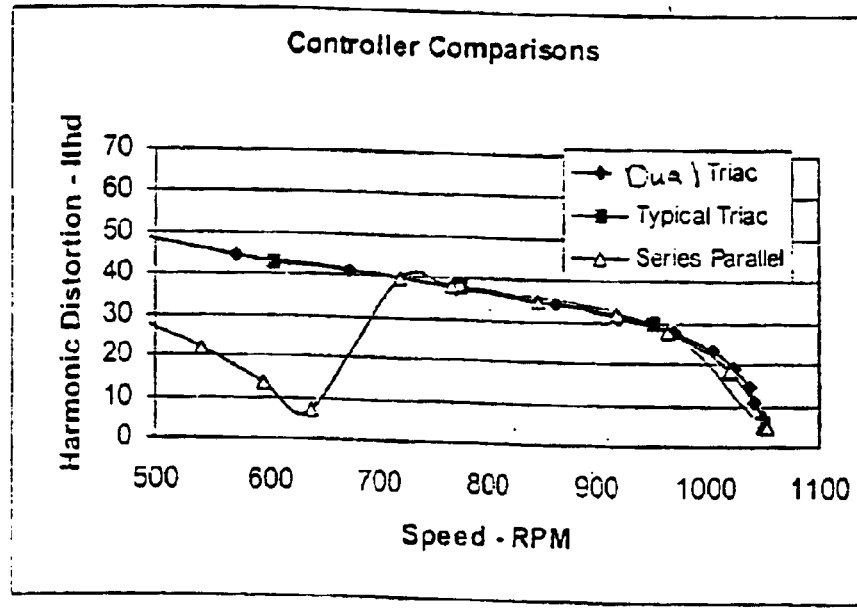

The data shown in FIGS. 10–13 was taken using a ½ HP Fasco 6 pole PSC motor and compares a dual triac controller of the present invention as shown in FIG. 3, a typical single triac controller as shown in FIG. 2, and a series/parallel controller as detailed in U.S. Pat. No. 6,329,783 to Vrionis et al., of common ownership herewith. FIG. 10 shows impact on power, FIG. 11 shows impact on current, FIG. 12 shows impact on power factor, and FIG. 13 shows impact on harmonic distortion (current total harmonic distortion (Ithd)).

By selection of the capacitor size, performance can be optimized for power, current, power factor, or harmonic distortion, but not all at the same time. If, as an example, lower power or current consumption were required at lower operating speeds, a larger capacitor would be selected. But, as shown, the larger capacitor will increase the power and current consumption at higher speeds and will also affect other operating parameters. A capacitor of larger than normal value for a standard PSC motor is contemplated for use in certain embodiments of the present invention when the most likely fan operation will take place at slower speeds.

For comparison with other variable speed controllers, FIGS. 14–17 compare three different types of triac controls: a Series/Parallel controller as detailed in U.S. Pat. No. 6,329,783 to Vrionis et al., of common ownership herewith; the typical single triac controller as known in the art and illustrated in FIG. 2; and the dual triac controller implementation of the present invention as illustrated in FIG. 3, for four key performance criteria: power, current, power factor, and harmonic distortion, respectively.

Two conclusions can be made from FIGS. 14–17:

1. The dual triac and the series/parallel controller behave in a similar manner so long as the series/parallel controller is operating in the parallel mode. The series/parallel controller has performance advantages in terms of power, current, power factor and harmonic distortion over the dual triac control when operating in the series mode.

2. A typical triac controller draws more power and current than a dual triac controller when operated at reduced speed.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

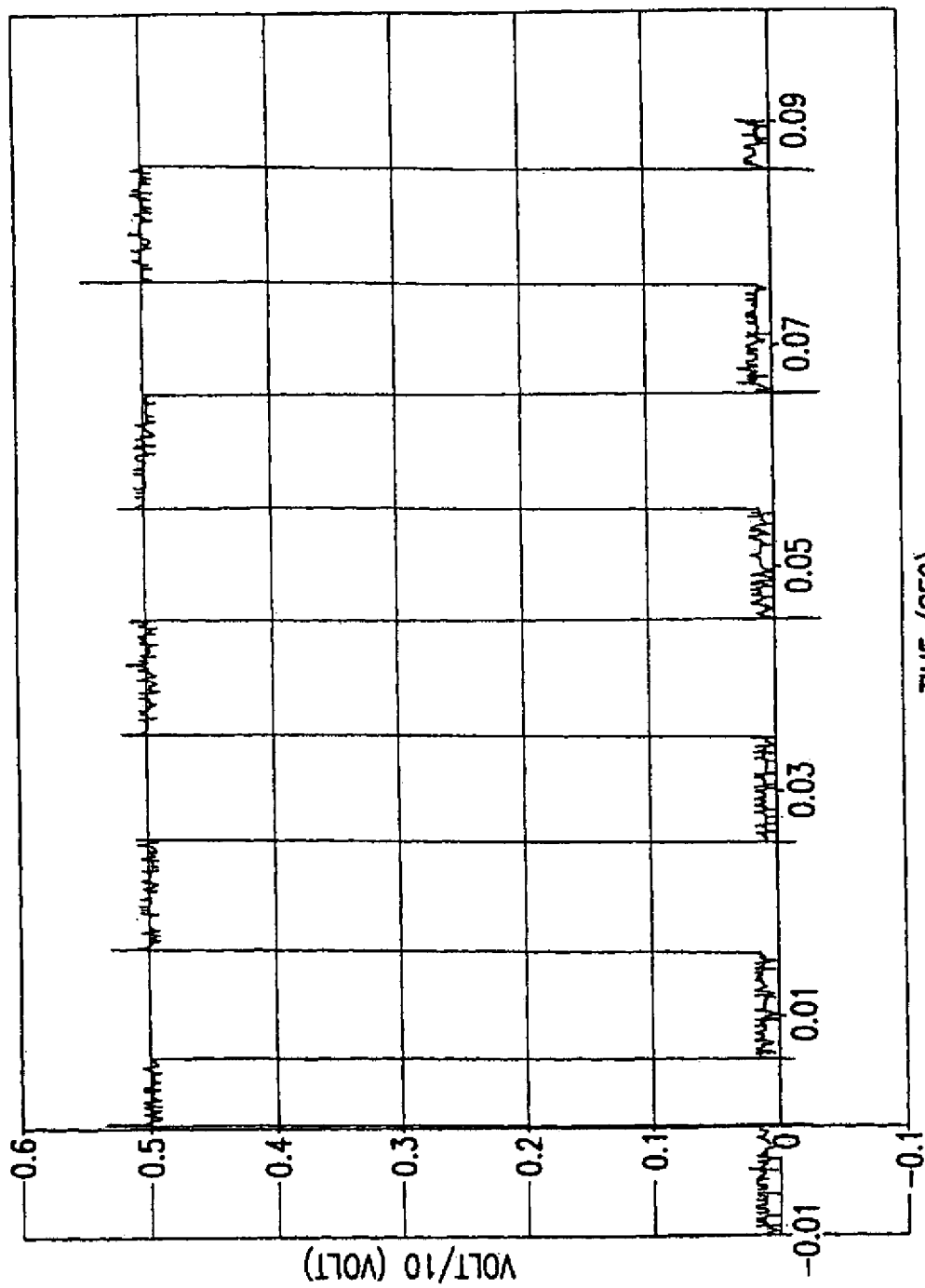

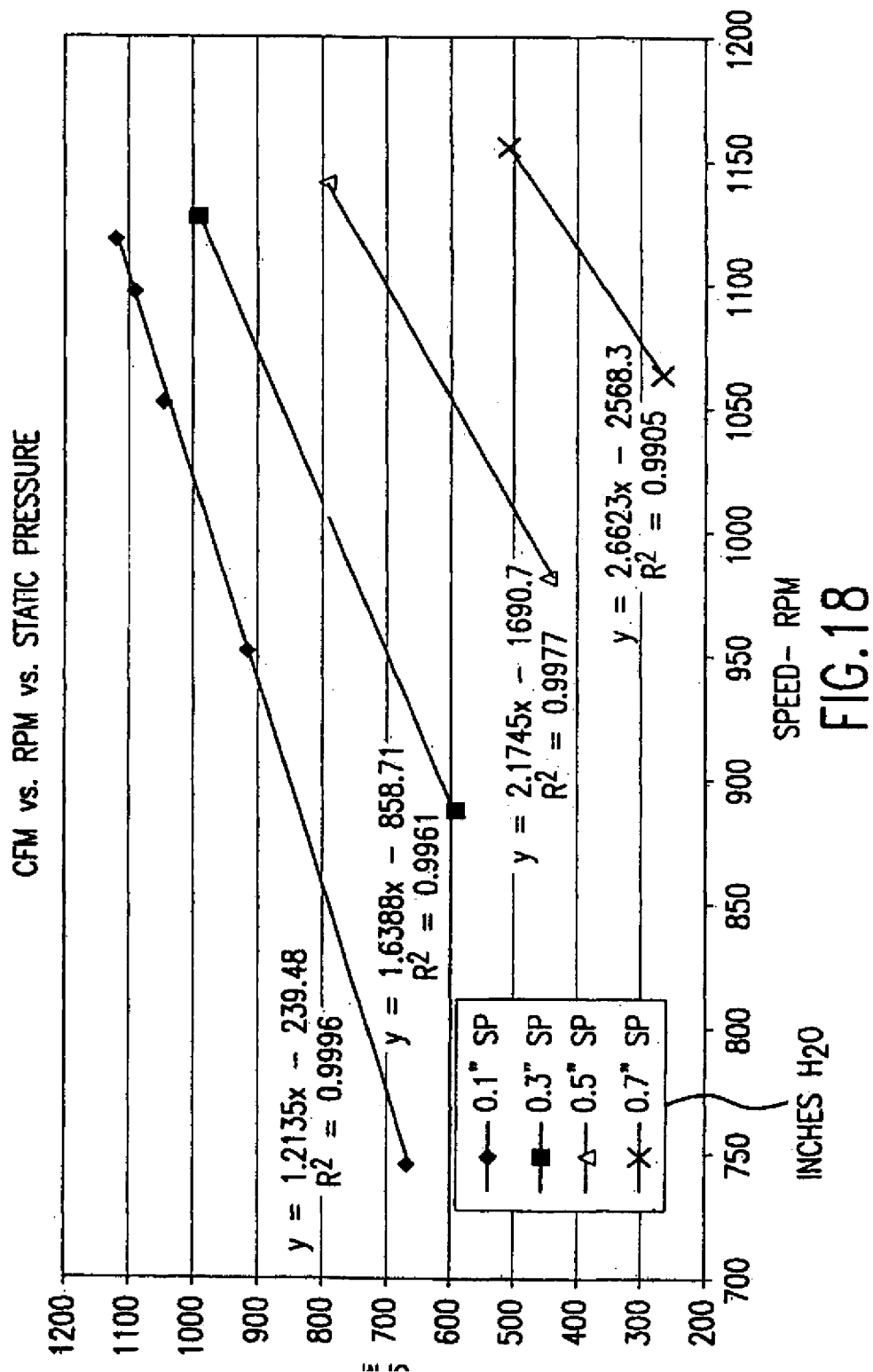

We claim:

1. A control system for an AC induction motor having a main winding and an auxiliary winding comprising:
    a) a first triac for connection in series with the auxiliary winding for controlling application of line voltage to the auxiliary winding;
    b) a second triac for connection in series with the main winding for modulating application of line voltage to the main winding;
    c) a command module connected to the first triac for switching the first triac on and off without modulating application of line voltage to the auxiliary winding; and
    d) the command module further connected to the second triac for regulating motor speed.

2. The control system according to claim 1 wherein the command module turns off voltage to the main winding and the auxiliary winding for motor sensing purposes.

3. The control system according to claim 2 wherein the motor sensing purpose is motor speed sensing and the command module includes circuitry for determining motor speed from induced voltage when line voltage is turned off by the first and second triacs.

4. The control system according to claim 1 wherein the command module is connected to at least one temperature sensor.

5. The control system according to claim 1 wherein the command module is connected to at least one pressure sensor.

6. The control system according to claim 3 wherein the command module is connected to at least one pressure sensor.

7. The control system according to claim 1 wherein the command module operates the second triac to create a variable motor speed.

8. The control system according to claim 7 wherein the motor speed is variable to maintain a selected volume of air flow.

9. The control system according to claim 7 wherein the motor speed is variable to maintain a substantially constant temperature.

10. The control system according to claim 7 wherein the motor speed is variable to maintain a substantially constant air pressure.

11. The control system according to claim 1 further including circuitry for bypassing the first and second triacs to permit full speed operation of the motor.

12. The control system according to claim 1 further including a capacitor in series with the auxiliary winding.

13. The control system according to claim 12 further including a capacitor size selected according to a most likely motor speed operation, with a most likely lower speed operation receiving a higher value capacitor than a most likely higher speed operation.

14. A control system for an AC induction motor having a main winding and an auxiliary winding comprising:
    a) a capacitor in series with the auxiliary winding;
    b) a first triac for connection in series with the auxiliary winding and capacitor for controlling application of line voltage to the auxiliary winding and the capacitor,
    c) a second triac for connection in series with the main winding for modulating application of line voltage to the main winding;
    d) a command module connected to the first triac for switching the first triac on and off without modulating application of line voltage to the auxiliary winding; and
    e) the command module further connected to the second triac for regulating motor speed;
    f) the command module further including circuitry for determining motor speed from induced voltage when line voltage is turned off by the first and second triacs; and
    g) at least one of a temperature sensor and a pressure sensor connected to the command module.

15. The control system according to claim 14 wherein the motor speed is variable to maintain a selected volume of air flow.

16. The control system according to claim 14 wherein the motor speed is variable to maintain a substantially constant temperature.

17. The control system according to claim 14 wherein the motor speed is variable to maintain a substantially constant air pressure.

18. The control system according to claim 14 wherein the control system includes a differential pressure sensor.

19. The control system according to claim 14 wherein the control system includes a static pressure sensor.

20. An air treatment system having at least one variable speed AC induction motor with a main winding and an auxiliary winding, comprising:
    a) a controller for an AC induction motor comprising:
        i) a capacitor in series with the auxiliary winding,
        ii) a first triac for connection in series with the auxiliary winding and capacitor for controlling application of line voltage to the auxiliary winding and the capacitor without modulating application of line voltage to the auxiliary winding;
        iii) a second triac for connection in series with the main winding for modulating application of line voltage to the main winding;
    b) a command module having inputs to the controller for regulating the controller; the command module connected to the first triac for switching the first triac on and off without modulating application of line voltage to the auxiliary winding; the command module further connected to the second triac for regulating motor speed;
    c) sensing apparatus including at least one of a pressure sensor, a motor speed sensor, and a temperature sensor, the at least one of a pressure sensor, a motor speed sensor, and a temperature sensor having an input to the command module, whereby the command module regulates the controller to vary the speed of the motor according to the input from the at least one of a pressure sensor, a motor speed sensor, and a temperature sensor.

21. The air treatment system according to claim 20 wherein the motor speed sensor includes circuitry for determining motor speed from a frequency of an induced voltage when line voltage is turned off by the first and second triacs.

22. The air treatment system according to claim 20 wherein the command module is connected to at least one temperature sensor.

23. The air treatment system according to claim 20 wherein the command module is connected to at least one of a static pressure sensor and a differential pressure sensor.

24. The air treatment system according to claim 22 wherein the command module is connected to at least one of a static pressure sensor and a differential pressure sensor.

25. The air treatment system according to claim 23 wherein the at least one pressure sensor is a differential pressure sensor.

26. The air treatment system according to claim 22 wherein the temperature sensor is a differential sensor comprising two separate sensors.

27. The air treatment system according to claim 23 wherein the command module determines air flow from the input of the pressure sensor and the speed sensor and varies motor speed to maintain a selected volume of airflow.

28. The air treatment system according to claim 22 wherein the motor speed is varied to maintain a substantially constant temperature.

29. The air treatment system according to claim 23 wherein the motor speed is varied to maintain a substantially constant air pressure.

30. The air treatment system according to claim 20 further including a capacitor size selected according to a most likely motor speed operation, with a most likely lower speed operation receiving a higher value capacitor than motors with a most likely higher speed operation.

31. The air treatment system according to claim 20 further including a first variable speed motor for an induced draft blower, and a second variable speed motor for a circulating fan; each of said first and second variable speed motors having a controller according to claim 20.

32. An air treatment system having at least one variable speed AC induction motor with a main winding and an auxiliary winding, comprising:
  a) a controller for an AC induction motor having means connected to one of the auxiliary winding and the main winding for modulating application of line voltage to the one of the auxiliary winding and the main winding without modulating application of line voltage to the other winding;
  b) a command module having inputs to the controller for regulating the controller, including inputs for turning off voltage to the main winding and the auxiliary winding for motor speed sensing purposes;
  c) a motor speed sensor including circuitry for determining motor speed from induced voltage when line voltage to the main winding and the auxiliary winding is turned off, the motor speed sensor being operably connected to the command module, whereby the command module can regulate the controller to vary the speed of the motor according to the input from the motor speed sensor.

33. The air treatment system according to claim 32 wherein the command module varies motor speed to maintain a selected volume of air flow.

34. The air treatment system according to claim 32 wherein the command module varies motor speed to maintain a substantially constant temperature.

35. The air treatment system according to claim 32 wherein the command module varies motor speed to maintain a substantially constant air pressure.

* * * * *

UNITED STATES PATENT AND TRADEMARK OFFICE
CERTIFICATE OF CORRECTION

| | | |
|---|---|---|
| PATENT NO. | : 6,864,659 B2 | Page 1 of 14 |
| APPLICATION NO. | : 10/191975 | |
| DATED | : March 8, 2005 | |
| INVENTOR(S) | : James W. Ratz et al. | |

It is certified that error appears in the above-identified patent and that said Letters Patent is hereby corrected as shown below:

The drawing sheets consisting of Figs. 1-18, should be deleted to be replaced with the drawing sheets, consisting of Figs. 1-18, as shown on the attached pages.

Signed and Sealed this

Ninth Day of November, 2010

David J. Kappos
*Director of the United States Patent and Trademark Office*

TYPICAL MOTOR CONNECTIONS

SINGLE SPEED MOTOR CONNECTIONS

TYPICAL MOTOR CONNECTIONS

THREE SPEED MOTOR CONNECTIONS

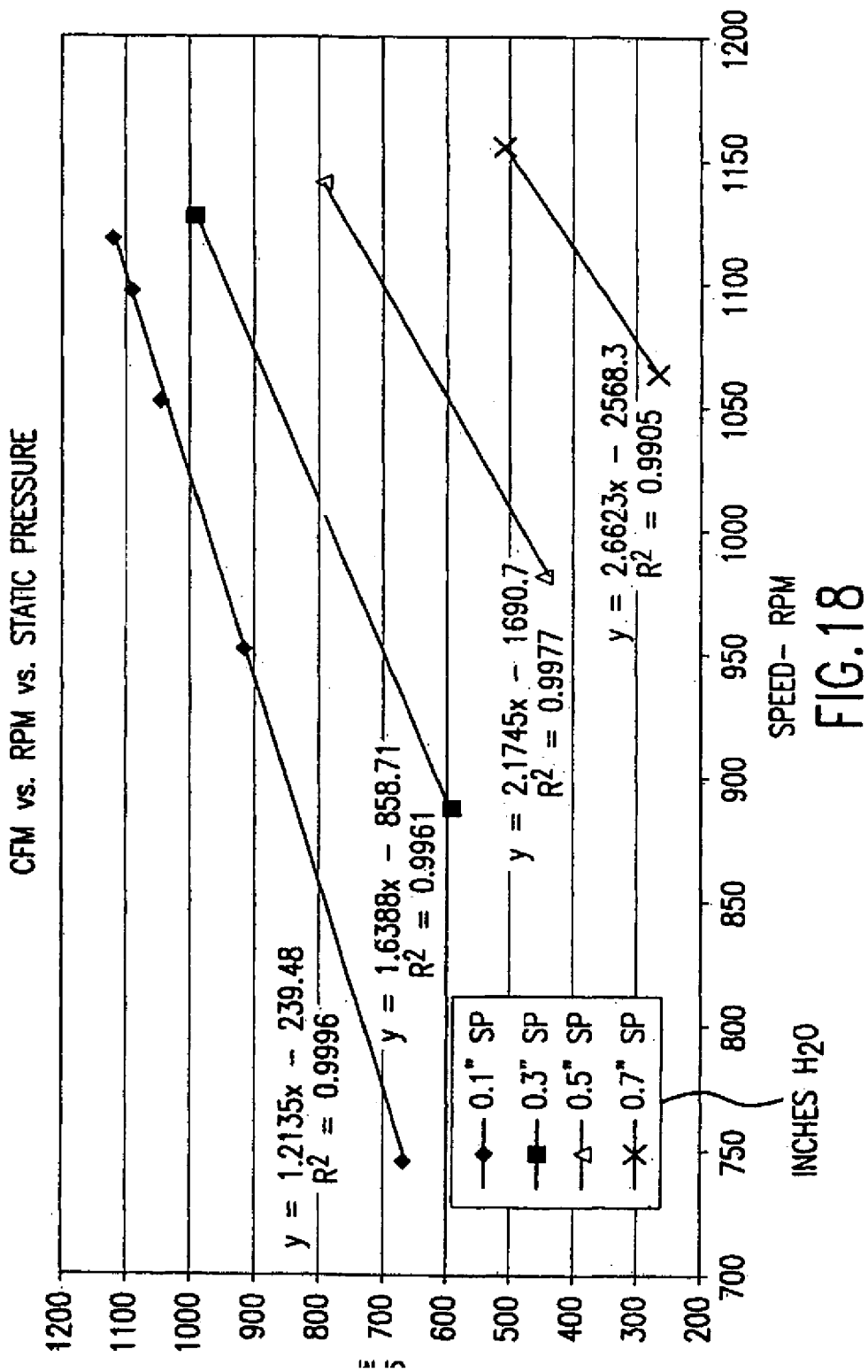

UNITED STATES PATENT AND TRADEMARK OFFICE
CERTIFICATE OF CORRECTION

| | | |
|---|---|---|
| PATENT NO. | : 6,864,659 B2 | Page 1 of 15 |
| APPLICATION NO. | : 10/191975 | |
| DATED | : March 8, 2005 | |
| INVENTOR(S) | : James W. Ratz et al. | |

It is certified that error appears in the above-identified patent and that said Letters Patent is hereby corrected as shown below:

Delete the title page and substitute therefore the attached title page consisting of corrected illustrative figure.

The drawing sheets consisting of Figs. 1-18, should be deleted to be replaced with the drawing sheets, consisting of Figs. 1-18, as shown on the attached pages.

This certificate supersedes the Certificate of Correction issued November 9, 2010.

Signed and Sealed this

Twenty-first Day of December, 2010

David J. Kappos
*Director of the United States Patent and Trademark Office*

(12) United States Patent
Ratz et al.

(10) Patent No.: US 6,864,659 B2
(45) Date of Patent: Mar. 8, 2005

(54) VARIABLE SPEED CONTROLLER FOR AIR MOVING APPLICATIONS USING AN AC INDUCTION MOTOR

(75) Inventors: James W. Ratz, Bloomington, MN (US); Paul E. Sigafus, Medina, MN (US); Larry L. Lutton, Burnsville, MN (US); Nickolas G. Vrionis, Los Altos, CA (US)

(73) Assignee: Varidigm Corporation, Plymouth, MN (US)

(*) Notice: Subject to any disclaimer, the term of this patent is extended or adjusted under 35 U.S.C. 154(b) by 29 days.

(21) Appl. No.: 10/191,975

(22) Filed: Jul. 9, 2002

(65) Prior Publication Data

US 2003/0030408 A1 Feb. 13, 2003

Related U.S. Application Data

(60) Provisional application No. 60/304,954, filed on Jul. 12, 2001.

(51) Int. Cl.[7] .............................. H02P 1/44; H02P 5/28; H02P 7/36
(52) U.S. Cl. .............................. 318/772; 318/727
(58) Field of Search .............................. 318/772, 727, 318/798, 806, 774, 781; 236/10, 91 F, 74 R, 74 A, 75–78; 431/16, 78

(56) References Cited

U.S. PATENT DOCUMENTS

| 4,266,175 A | * | 5/1981 | Braun et al. ............... 318/758 |
| 4,421,268 A |   | 12/1983 | Bassett et al. ............... 236/10 |
| 4,443,749 A | * | 4/1984 | Douthart et al. ............ 318/774 |
| 4,481,786 A | * | 11/1984 | Bashark ...................... 318/438 |
| 4,562,397 A |   | 12/1985 | Kitabayashi et al. ........ 318/814 |
| 4,605,888 A |   | 8/1986 | Kim .............................. 318/786 |
| 4,658,195 A |   | 4/1987 | Min .............................. 318/786 |
| 4,945,298 A |   | 7/1990 | Satake ......................... 318/538 |
| 5,276,392 A |   | 1/1994 | Beckerman ................. 318/751 |
| 5,561,356 A |   | 10/1996 | Nanos ......................... 318/729 |
| 5,594,312 A |   | 1/1997 | Schwendemann et al. .. 318/799 |
| 5,680,021 A | * | 10/1997 | Hollenbeck ................. 318/432 |
| 5,808,441 A |   | 9/1998 | Nehring ....................... 318/751 |
| 5,867,005 A |   | 2/1999 | Brown ......................... 318/751 |
| 5,883,487 A |   | 3/1999 | Rosenzweig et al. ....... 318/781 |
| 5,883,490 A |   | 3/1999 | Moreira ....................... 318/807 |
| 5,986,419 A |   | 11/1999 | Archer et al. ............... 318/254 |
| 6,208,113 B1 |  | 3/2001 | Lelkes et al. ................ 318/807 |
| 6,329,783 B1 |  | 12/2001 | Vrionis et al. ............... 318/772 |
| 6,329,785 B1 | * | 12/2001 | Starkie et al. ............... 318/811 |
| 6,504,338 B1 | * | 1/2003 | Eichorn ....................... 318/727 |

FOREIGN PATENT DOCUMENTS

| FR | 2 608 859 | 6/1988 | ............. H02P/1/44 |
| JP | 61 009179 | 1/1986 | ............. H02P/1/42 |

OTHER PUBLICATIONS

Translation Document (Abstract) FR 2608859 A1.*

* cited by examiner

*Primary Examiner*—Shih-Yung Hsieh
*Assistant Examiner*—Edgardo San Martin
(74) *Attorney, Agent, or Firm*—Pauley Petersen & Erickson

(57) ABSTRACT

An HVAC system has at least one variable speed controller for an AC induction motor, especially of the Permanent Split Capacitor (PSC) type. The variable speed controller provides switched power via a modulating triac to the main coils of the motor and constant power via an on/off triac to the auxiliary coils during operation. A large value capacitor is placed in line with the auxiliary coils to reduce power consumption and current draw over that of known systems. Power to the motor can be turned off to provide for motor speed sensing through monitoring the frequency of a generated voltage when the power is turned off. Frequency-based motor speed sensing is accomplished by shutting off all current to the motor and measuring zero crossings on the generated voltage of the decaying magnetic field. The controller can be easily retrofitted onto existing motors. An optional controller bypass is provided to run the motor at rated speed in case of controller failure.

35 Claims, 13 Drawing Sheets

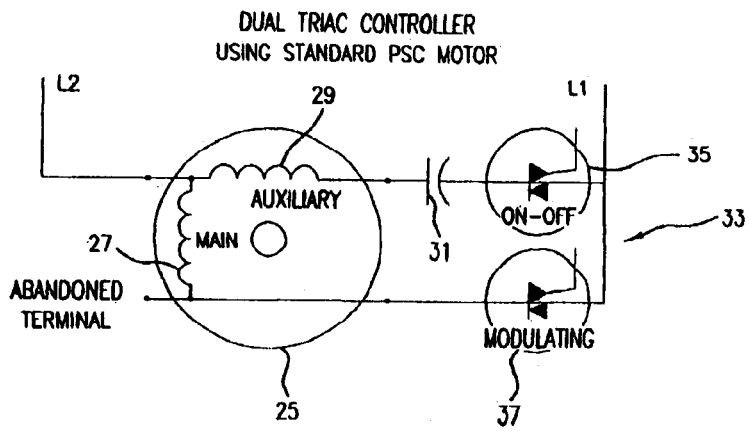

TYPICAL MOTOR CONNECTIONS

SINGLE SPEED MOTOR CONNECTIONS

TYPICAL MOTOR CONNECTIONS

THREE SPEED MOTOR CONNECTIONS

BLOCK DIAGRAM
RPM SENSING CIRCUIT